United States Patent
Hammerle et al.

(10) Patent No.: US 12,489,778 B1
(45) Date of Patent: Dec. 2, 2025

(54) CONTEXT REPOSITORY MANAGEMENT

(71) Applicant: Dropzone.ai, Inc., Seattle, WA (US)

(72) Inventors: Eric Joseph Hammerle, Kirkland, WA (US); Xue Jun Wu, Seattle, WA (US); Colin James Phillips, Kirkland, WA (US); Changhwan Oh, Shoreline, WA (US); Robert Rowland Foley, Long Island City, NY (US); Michael Francis Buono, McLean, VA (US)

(73) Assignee: Dropzone.ai, Inc., Seattle, WA (US)

(*) Notice: Subject to any disclaimer, the term of this patent is extended or adjusted under 35 U.S.C. 154(b) by 0 days.

(21) Appl. No.: 19/296,689

(22) Filed: Aug. 11, 2025

(51) Int. Cl.
*H04L 9/40* (2022.01)

(52) U.S. Cl.
CPC ............... *H04L 63/1433* (2013.01)

(58) Field of Classification Search
None
See application file for complete search history.

(56) References Cited

U.S. PATENT DOCUMENTS

| | | |
|---|---|---|
| 7,330,817 B1 | 2/2008 | Exall et al. |
| 9,600,659 B1 | 3/2017 | Bird et al. |
| 10,198,433 B2 | 2/2019 | Weston et al. |
| 10,666,666 B1 | 5/2020 | Saurabh |
| 10,694,026 B2 | 6/2020 | Chandrasekaran et al. |
| 11,916,767 B1 | 2/2024 | Wu et al. |
| 11,943,387 B1 | 3/2024 | Wolinsky et al. |
| 11,960,515 B1 | 4/2024 | Pallakonda et al. |

(Continued)

FOREIGN PATENT DOCUMENTS

| | | |
|---|---|---|
| CN | 115981240 B | 6/2023 |
| WO | 2025/029346 A1 | 2/2025 |

OTHER PUBLICATIONS

Office Communication for U.S. Appl. No. 18/230,123 mailed Sep. 25, 2023, 9 Pages.

(Continued)

*Primary Examiner* — Nelson S. Giddins
(74) *Attorney, Agent, or Firm* — John W. Branch; Branch Partners PLLC

(57) ABSTRACT

Embodiments manage context repositories in computing environments to enhance automated security analysis. Embodiments obtain context records containing supplemental information associated with security events and integrates them into prompts for large language models (LLMs) to generate severity scores for event classification. Embodiments apply criteria to invalidate outdated or unreliable context records based on age, source reliability, and usage frequency, then modifies prompts and repositories accordingly. Enhanced prompts incorporate context record summaries and entity relationship mappings to improve subsequent event analysis. Embodiments dynamically evaluates context records through quality filters, consolidates duplicates, and maintains audit trails with provenance tracking. User interfaces are dynamically transformed based on telemetry metrics and user feedback to optimize analyst workflows. Embodiments enable organizations to maintain curated, high-quality context repositories that continuously improve AI-assisted security analysis while reducing false positives and enhancing incident response effectiveness.

20 Claims, 14 Drawing Sheets

(56) References Cited

U.S. PATENT DOCUMENTS

| | | | |
|---|---|---|---|
| 12,008,332 B1 | 6/2024 | Gardner et al. | |
| 12,034,616 B1 | 7/2024 | Wu et al. | |
| 12,105,746 B1 | 10/2024 | Wu et al. | |
| 12,229,313 B1 | 2/2025 | Shastry et al. | |
| 12,248,501 B1 | 3/2025 | Wu et al. | |
| 2003/0093276 A1 | 5/2003 | Miller et al. | |
| 2013/0343205 A1 | 12/2013 | Dolan et al. | |
| 2015/0347569 A1 | 12/2015 | Allen et al. | |
| 2016/0171068 A1* | 6/2016 | Hardin | G06F 16/24565 707/610 |
| 2016/0342317 A1 | 11/2016 | Lim et al. | |
| 2018/0240043 A1 | 8/2018 | Majumdar et al. | |
| 2019/0138879 A1 | 5/2019 | Hu et al. | |
| 2020/0184072 A1 | 6/2020 | Ikeda | |
| 2020/0387816 A1 | 12/2020 | Rodriguez Bravo et al. | |
| 2021/0174095 A1* | 6/2021 | Kong | G06F 3/167 |
| 2022/0295008 A1* | 9/2022 | Nold | H04N 5/77 |
| 2022/0391595 A1 | 12/2022 | Shevelev et al. | |
| 2023/0208971 A1 | 6/2023 | Te Booij et al. | |
| 2023/0244869 A1 | 8/2023 | Neumann | |
| 2023/0359789 A1 | 11/2023 | Andre et al. | |
| 2024/0045990 A1 | 2/2024 | Boyer et al. | |
| 2024/0054233 A1 | 2/2024 | Ohayon et al. | |
| 2024/0070251 A1 | 2/2024 | Maizels et al. | |
| 2024/0134865 A1 | 4/2024 | Bierner et al. | |
| 2024/0260892 A1 | 8/2024 | Haas et al. | |
| 2024/0281472 A1 | 8/2024 | Larhette et al. | |
| 2024/0291779 A1 | 8/2024 | Catalano et al. | |
| 2024/0291853 A1 | 8/2024 | Murphy et al. | |
| 2024/0323152 A1 | 9/2024 | Rosenberg et al. | |
| 2024/0355337 A1 | 10/2024 | Altaf et al. | |
| 2024/0363099 A1 | 10/2024 | Altaf et al. | |
| 2024/0363103 A1 | 10/2024 | Altaf et al. | |
| 2024/0393750 A1 | 11/2024 | Malladi et al. | |
| 2024/0402664 A1 | 12/2024 | Sudhakar et al. | |
| 2024/0403416 A1 | 12/2024 | Sharpe et al. | |
| 2024/0403634 A1 | 12/2024 | Hawes et al. | |
| 2024/0411994 A1 | 12/2024 | Siracusano et al. | |
| 2024/0412031 A1 | 12/2024 | Rayman | |
| 2024/0412839 A1 | 12/2024 | Tang et al. | |
| 2024/0414211 A1 | 12/2024 | Boyer et al. | |
| 2025/0037107 A1 | 1/2025 | Abdelrahman et al. | |
| 2025/0047578 A1 | 2/2025 | Wu et al. | |
| 2025/0053273 A1 | 2/2025 | Uva | |

OTHER PUBLICATIONS

Office Communication for U.S. Appl. No. 18/230,123 mailed Dec. 12, 2023, 22 Pages.

Office Communication for U.S. Appl. No. 18/587,712 mailed May 14, 2024, 14 Pages.

Office Communication for U.S. Appl. No. 18/652,093 mailed Jul. 31, 2024, 21 Pages.

Office Communication for U.S. Appl. No. 18/753,778 mailed Sep. 5, 2024, 16 Pages.

International Search Report and Written Opinion for International Patent Application No. PCT/US2024/028612 mailed Aug. 6, 2024, 14 Pages.

Sreake Division, "Achieving operational efficiency in Kubernetes with ChatGPT-4: Troubleshooting", Three Shakes Inc., Blog; May 23, 2023, 57 pages.

Fixpoint Inc., "Decision to release fault notification service using LLM", PR Times, Jul. 18, 2023, 4 pages.

Office Communication for U.S. Appl. No. 18/902,566 mailed Dec. 6, 2024, 21 Pages.

Office Communication for U.S. Appl. No. 18/753,778 mailed Dec. 30, 2024, 10 Pages.

Office Communication for U.S. Appl. No. 18/753,778 mailed Mar. 20, 2025, 4 Pages.

Office Communication for U.S. Appl. No. 18/978,990 mailed Mar. 12, 2025, 23 Pages.

Office Communication for U.S. Appl. No. 18/753,778 mailed Apr. 23, 2025, 11 Pages.

Office Communication for U.S. Appl. No. 18/978,990 mailed Jul. 7, 2025, 18 Pages.

\* cited by examiner

CONTEXT REPOSITORY MANAGEMENT

TECHNICAL FIELD

These innovations relate generally to computer associated security, and more particularly, but not exclusively, to context repository management.

BACKGROUND

As organizations become increasingly dependent on heterogenous computer environments that may include complex networks, remote services, distributed services, or the like, managing and monitoring infrastructure access in such computing environments can become both increasingly critically important and increasingly complex. Difficulties associated with managing computing environments may not be new, however, interconnections among remote offices, data centers, remote employees, remote customers, and so on, have resulted in organizations relying more broadly on heterogeneous distributed services, or the like. To help manage their information technology infrastructure, organizations have developed various strategies to protect their technology and infrastructure from direct threats or indirect threats. One practice is to install monitoring technology that can observe or detect various activities, behaviors, or operational quality in their computing environments. Automated monitoring, related incident investigations, or user feedback may generate substantial amounts of information of varying quality or importance. In some cases, some of information may be useful for pending or subsequent investigations. However, the amount of information may overwhelm organizations or analysts, which may make it difficult to make efficient or effective use the information. Thus, it is with respect to these considerations and others that these present innovations have been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
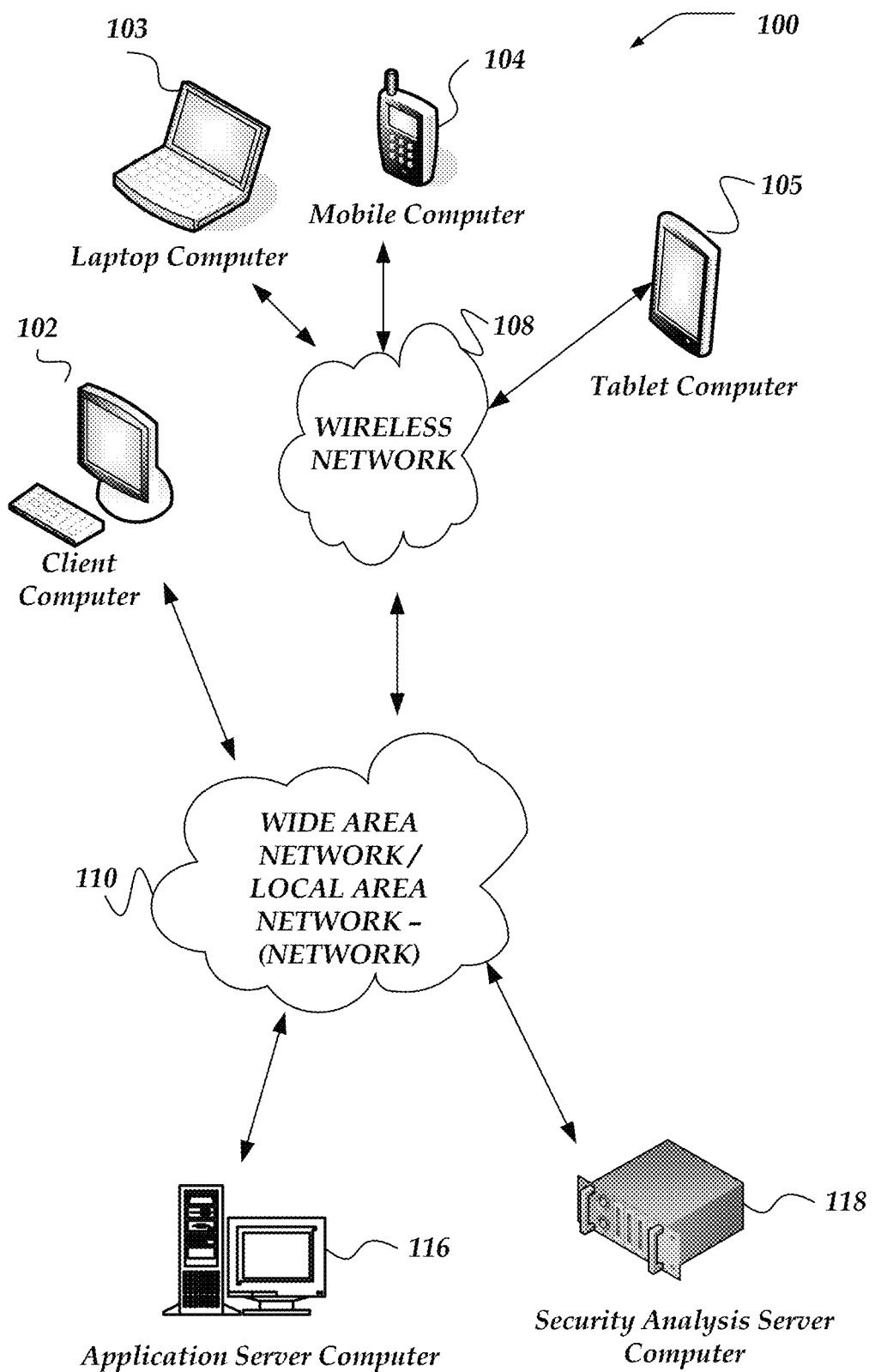
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which these innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of these innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java, PHP, Perl, Python, R, Julia, JavaScript, Ruby, VBScript, Microsoft .NET languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the terms "large language model," or "LLM" refer to data structures, programs, or the like, that may be trained or designed to perform a variety of natural language processing tasks. Typically, LLMs may generate text responses in response to text based prompts. Often, LLMs may be considered to be neural networks that have been trained on large collections of natural language source documents. Accordingly, in some cases, LLMs may be trained to generate predictive responses based on provided prompts. LLM prompts may include context information, examples, or the like, that may enable LLMs to generate responses directed to specific queries or particular problems that go beyond conventional NLP.

As used herein, the terms "prompt, or "prompt dataset" refer to one or more data structures that contain or represent prompt information that may be provided to LLMs.

As used herein, the term "event," or "event information" as used herein refer one or more data structures or messages that may report alerts, outcomes, conditions, or occurrences that may be detected or observed in a networked computing environment. Event information may include additional context information associated with an event, such as event source, event type, or the like. Organizations may deploy various systems may be configured to monitor various types of events depending on needs of an industry or technology area. For example, information technology services may generate events in response to one or more conditions, such as, computers going offline, memory over-utilization, CPU over-utilization, storage quotas being met or exceeded, applications failing or otherwise becoming unavailable, networking problems (e.g., latency, excess traffic, unexpected lack of traffic, intrusion attempts, or the like), electrical problems (e.g., power outages, voltage fluctuations, or the like), customer service requests, or the like, or combination thereof. Events may be provided using one or more messages, emails, telephone calls, library function calls, application programming interface (API) calls, including any signals provided to indicate that an event has occurred. One or more third party and/or external systems may be configured to generate event messages.

As used herein, the term "context repository" refers to one or more databases, or storage systems that organize and manage context records containing supplemental information that may be used to enrich inputs to generative artificial intelligence models or other analysis systems. Context repositories may include structured collections of context records that store factual information, entity relationships, metadata attributes, provenance data, or the like associated with security investigations. Context repositories may support operations including context record retrieval, filtering, validation, consolidation, organization, version control, or the like. Context repositories may be employed to provide contextual information to large language models or automated analysis processes to improve event classification, incident investigation, or security decision-making activities.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of these innovations to provide a basic understanding of some aspects of these innovations. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to context repository management.

In one or more of the various embodiments, context records may be obtained from a repository such that each context record includes supplemental information associated with events.

In one or more of the various embodiments, severity scores for events may be collected based on prompts and context records such that the context records may be included in the prompts.

In one or more of the various embodiments, criteria may be obtained to invalidate a portion of the context records such that the criteria may include an age of a context record, source reliability, a conflict with one or more other context records, or usage frequency.

In one or more of the various embodiments, prompts and the repository may be modified based on removal of the invalidated portion of the context records.

In one or more of the various embodiments, other severity scores for other events may be collected based on the modified prompts such that the other severity scores may be used to evaluate events for a report.

In one or more of the various embodiments, a user interface may be obtained that includes display panels for content that includes the report and other information associated with the events such that the content may be dynamically transformed and arranged for display to a user based on user interaction telemetry, user feedback and telemetry metrics.

In one or more of the various embodiments, one or more portions of the one or more context records may be collected from external data sources including security information and event management systems, user directory services, or configuration management databases such that another criteria may be obtained to validate the context records including source reliability metrics or temporal relevance indicators.

In one or more of the various embodiments, duplicate context records may be collected based on content similarity analysis such that the duplicate context records may include redundant context records, overlapped information content, or repetitive data elements, and the duplicate context records may be consolidated.

In one or more of the various embodiments, context quality filters may be obtained to filter the context records based on confidence scores or source attribution such that another portion of the context records that passes the context quality filters may be retained.

In one or more of the various embodiments, enhanced prompts may be obtained that include context record summaries and entity relationship mappings such that the enhanced prompts may include threat assessment templates, guidance frameworks, or analytical structures, and the enhanced prompts may be used to train severity assessment models to improve subsequent event classification.

In one or more of the various embodiments, composite context records may be obtained based on consolidation of complementary individual context records such that the composite context records may include aggregated entity information, combined relationship data, or overlapping time windows.

In one or more of the various embodiments, context provenance records may be collected based on record creation timestamps or modification history such that the context provenance records may include origination sources, update sequences, or verification status, and an audit trail for the context records may be maintained using the context provenance records.

In one or more of the various embodiments, context record utilization patterns may be obtained based on access frequency or investigation contribution such that the context record utilization patterns may include retrieval frequency metrics, impact scores, or usage trend indicators, and the repository may be organized based on the context record utilization patterns.

In one or more of the various embodiments, repository schemas may be obtained based on the context records such that the repository schemas may include entity relationship definitions, metadata field specifications, or data type constraints, and the context records may be organized according to the repository schemas for retrieval.

In one or more of the various embodiments, context evaluation criteria may be collected based on temporal relevance measures or usage frequency patterns such that the context evaluation criteria may include record age thresholds, access frequency metrics, or relevance degradation indicators, and the context record evaluation criteria may be applied to identify context records eligible for removal from the repository or archival.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)-(network) 110, wireless network 108, client computers 102-105, application server computer 116, security analysis server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, security analysis server computer 118, or other computers.

Client computers 102-105 may further be configured to include a client application that enables an end-user to log into an end-user account that may be managed by another computer, such as application server computer 116, security analysis server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to security analysis server computer 118. Also, client computers may be arranged to enable users to display reports, interactive user-interfaces, results provided by security analysis server computer 118, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, security analysis server computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116, and security analysis server computer 118 are described in more detail below in conjunction with FIG. 3. Although FIG. 1 illustrates application server computer 116, or security analysis server computer 118 each as a single computer, the innovations or embodiments are not so limited. For example, one or more functions of application server computer 116, or security analysis server computer 118, or the like, may be distributed across one or more distinct network computers. Moreover, in one or more embodiments, security analysis server computer 118 may be implemented using a plurality of network computers. Further, in one or more of the various embodiments, application server computer 116, or security analysis server computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
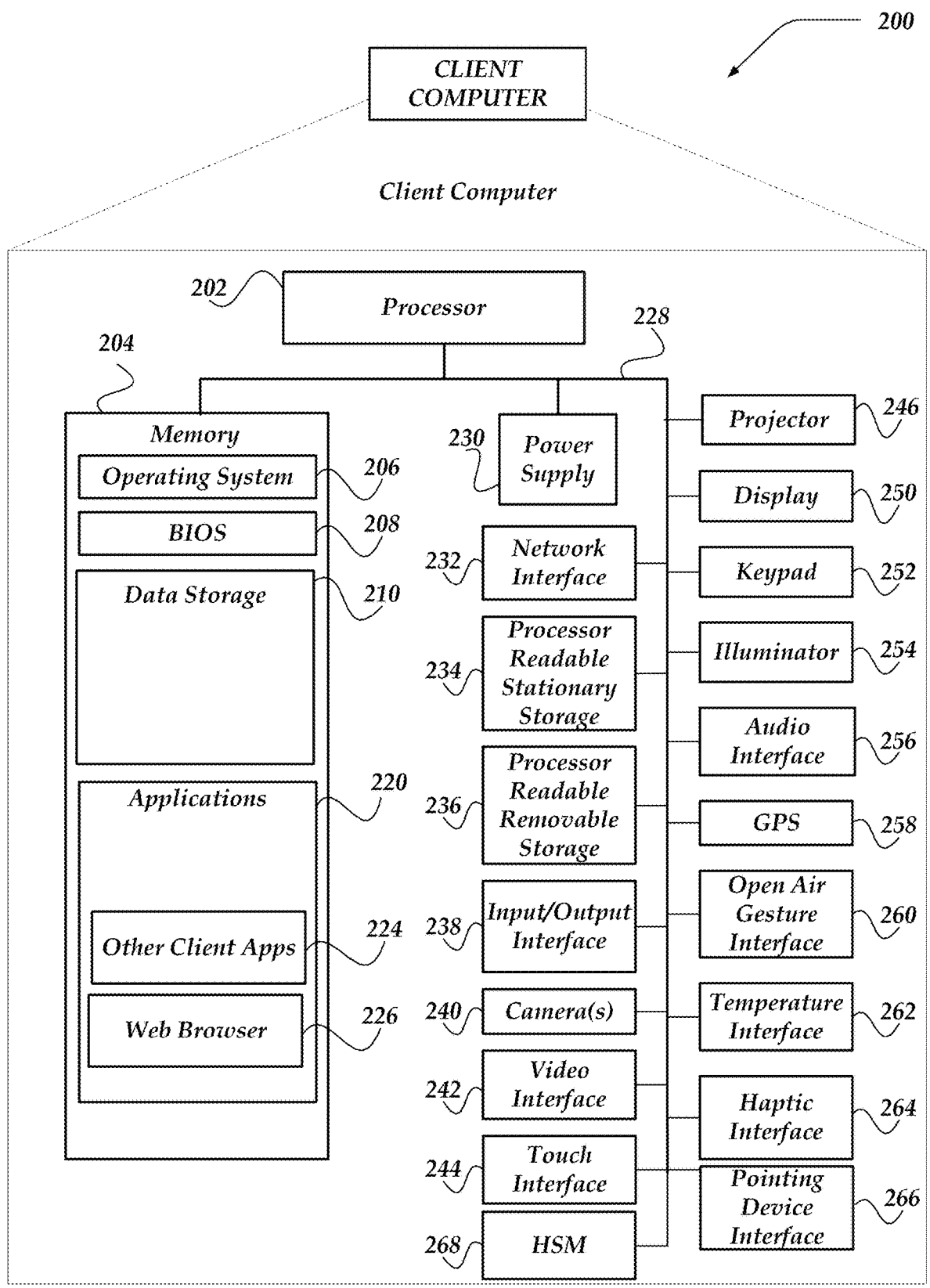
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth, Zigbee, or the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by processors, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, log data, API calls, or the like, combination thereof, with application servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
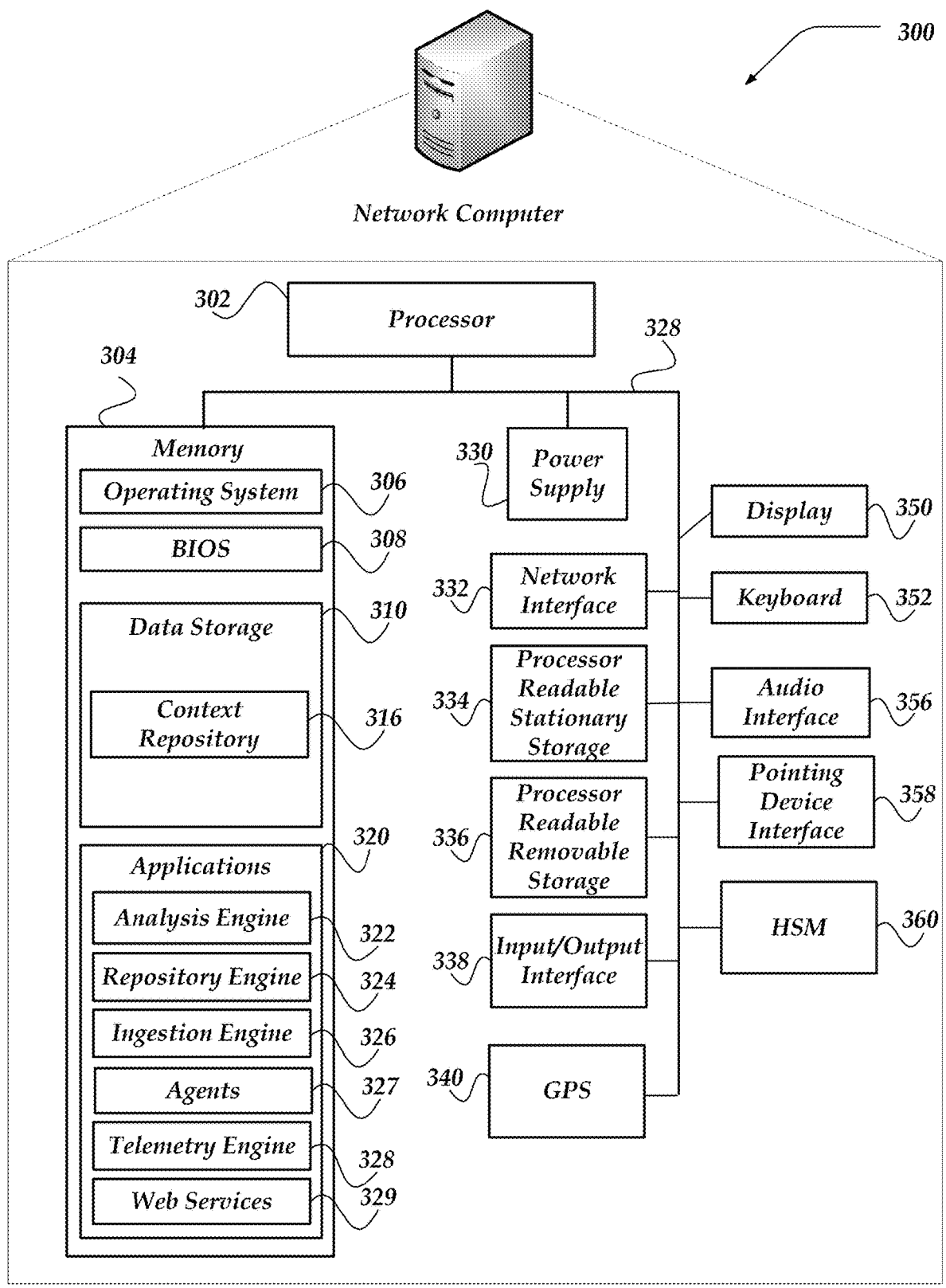
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, security analysis server computer 118 shown in FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300. In some embodiments, processor-readable stationary storage device 334 or processor-readable removable storage device 336 may be considered a processor or computer readable non-transitory storage media that includes instructions configured for context repository management in a computing environment such that execution of the instructions by one or more processors on one or more network computers performs actions described herein.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the network computer or client computers, including for example, a Media Access Control (MAC) address, IP address, and the like.

In at least one of the various embodiments, applications, such as, operating system 306, analysis engine 322, repository engine 324, ingestion engine 326, agents 327, telemetry engine 328, web services 329, or the like, may be arranged to employ geo-location information to select one or more localization features, such as, time zones, languages, currencies, calendar formatting, or the like. Also, localization features may be used when interpreting network traffic, application protocols, user-interfaces, generating reports, monitoring infrastructure access in different regions, or the like. Localization may be employed by one or more internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, context repository 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include analysis engine 322, repository engine 324, ingestion engine 326, agents 327, telemetry engine 328, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, analysis engine 322, repository engine 324, ingestion engine 326, agents 327, telemetry engine 328, web services 329, or the like, may be operative in a cloud-based computing environment. In one or more of the various embodiments, these applications, and others may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to analysis engine 322, repository engine 324, ingestion engine 326, agents 327, telemetry engine 328, web services 329, or the like, may be provisioned and de-commissioned automatically.

Also, in one or more of the various embodiments, analysis engine 322, repository engine 324, ingestion engine 326, agents 327, telemetry engine 328, web services 329, or the like, may be located in virtual servers running in a cloud-based computing environment rather than being tied to one or more specific physical network computers. Likewise, in some embodiments, one or more of analysis engine 322, repository engine 324, ingestion engine 326, agents 327, telemetry engine 328, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
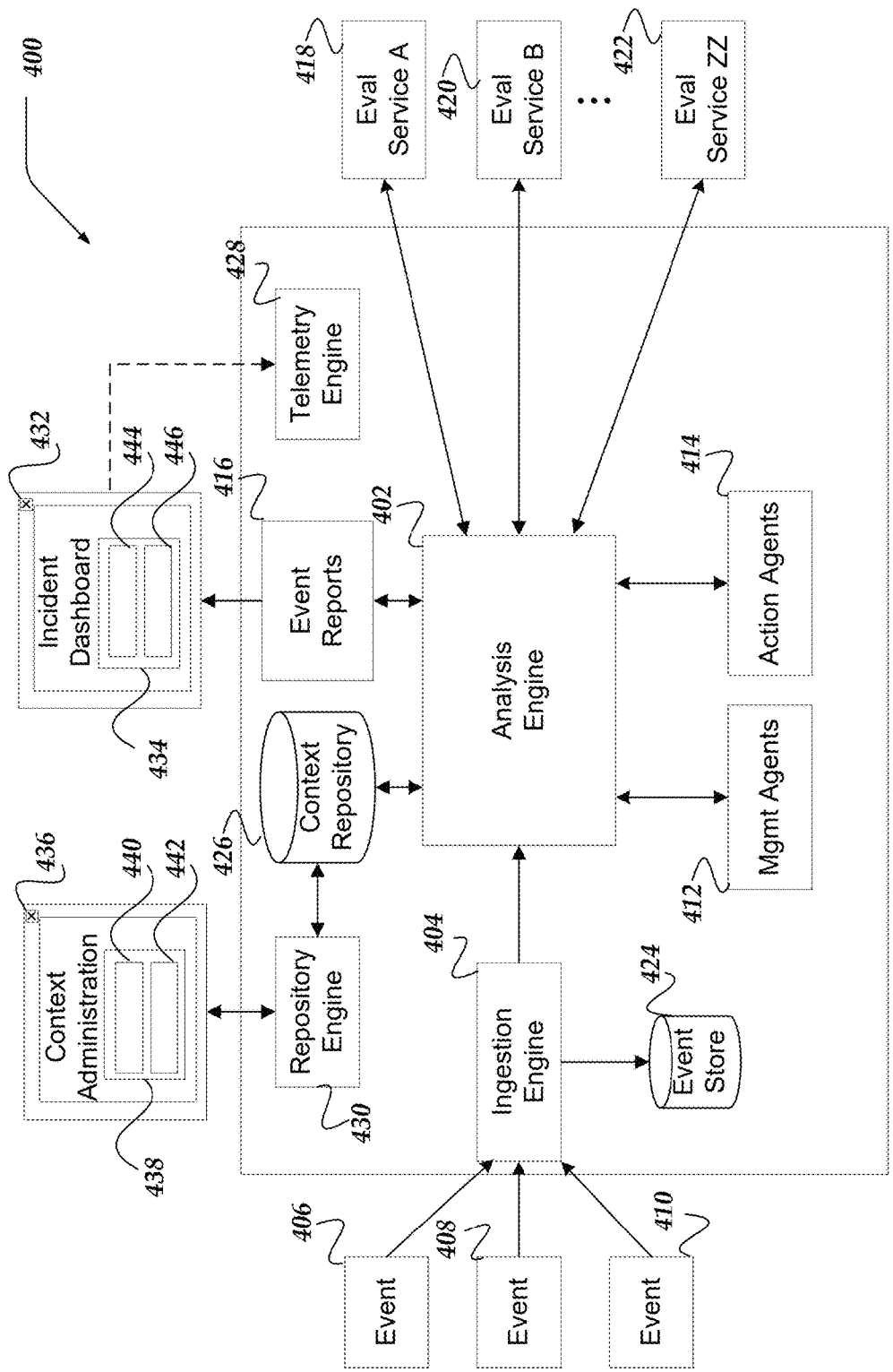
FIG. 4 illustrates a logical architecture of a system for context repository management in accordance with one or more of the various embodiments.

FIG. 4 illustrates a logical architecture of system 400 for context repository management in accordance with one or more of the various embodiments.

One of ordinary skill in the art will appreciate that context repositories or associated innovations may be employed in a wide variety of business domains or subject matter areas rather than being limited to network security applications such as described herein. However, for brevity and clarity various embodiments associated with network security may be described here as practical or tangible applications of the disclosed innovations. Accordingly, in some embodiments, while employing the innovations in such circumstances is novel, these innovations should not be considered limiting with respect to how the context repository innovations may be applied in other domains that use generative AI, large language models, or the like.

In one or more of the various embodiments, analysis engines, such as analysis engine 402 may be provided one or more events, such as event 406, event 408, event 410, or the like, via an ingestion engine, such as, ingestion engine 404. Accordingly, in some embodiments, as event information may be ingested, analysis engines may be arranged to employ one or more agents, such as, management agents 412, action agents 414, or the like, to evaluate the events to determine if the events may be events that may be worthy of taking notice. Thus, in some embodiments, analysis engines may be arranged to generate one or more reports, such as, event reports 416 that include information about the one or more events based on the evaluation.

In one or more of the various embodiments, agents, including management agents 412 or action agents 414 may be arranged to communicate with one or more internal or external services that may contribute to the evaluation of events. In this example, for some embodiments, service 418, service 420, or service 422 may be considered to represent one or more internal or external (e.g., third-party SaaS) evaluation services.

In one or more of the various embodiments, organizations may conventionally deploy computing environments that may include various services, applications, devices, systems, or the like, that may monitor various features or metrics associated with their computing infrastructure. In some cases, multiple applications or services may be configured to generate event information, such as log entries, event notifications, alarms, alerts, or the like, that may be relevant to the particular applications or services. Also, in some embodiments, organizations may employ one or more dedicated monitoring tools that may be configured to generate event information associated with various conditions or activity that may occur in the monitored environments. Further, in some embodiments, organizations may deploy one or more network devices that monitor network activity, enforce access policies, balance workloads, or the like. Also, in some embodiments, many organizations may include one or more customized monitoring or alerting systems that may be directed to generating event information associated with their particular operating environments. In general, in some embodiments, organizations may configure their networking environments or computing environments to automatically generate an arbitrary number of events or event information depending on their local requirements or local circumstances. Note, herein computing environments may be alternatively described using terms such as networked environments, monitored networks, or the like. For brevity and clarity these terms may be considered to be computing environments and are not restricted to networks, networked environments, or the like. Also, in some cases, the innovations disclosed herein may be practiced using a single computer or computing device.

In some cases, organizations may be faced with interpreting or processing many events or different event types generated by various sources within or associated with their computing/networking environments. Accordingly, in some cases, administrators may be overwhelmed by the sheer number of events coming from these many sources. Also, in some embodiments, commonly some (or many) events may be considered false positives in that they may be safely ignored or they may be incorrectly reporting a safe signal or safe condition as being unsafe.

Further, in some cases, modern computing environments may often be dynamic with computers (e.g., virtual computers, container-based services, personal computing devices) joining or leaving the networks. Similarly, in some embodiments, networks for some organizations may dynamically be adding physical devices, services, applications, or the like, depending on local circumstances or local requirements.

Accordingly, in some cases, organizations may be required to manually determine which events may be considered actionable. In this case, manual determination may include the creation or deployment of filters, classifiers, or the like, that are directed to particular known false positive events. However, in some cases, administrators for organizations may be required to validate/verify many events to determine which events may be false positives. Further, in some cases, such classification may require administrators to perform a wide-variety of ad-hoc operations to track down the source of the event or the source of the circumstances or conditions that may have triggered the event in the first place.

Conventionally, in some cases, administrators may be required to manually employ different internal services or external services that may help classify incoming events. Further, in some cases, different administrators may approach event classification differently from one another such that different administrators may perform different actions or perform actions in an order of operation different from other administrators. Accordingly, in some cases, the veracity or quality of event classification may vary depending on personal preferences or individual biases rather than objective criteria or operations.

Accordingly, in some embodiments, events, such as, event 406, event 408, or event 410 may be provided to an ingestion engine, such as ingestion engine 404. In some embodiments, ingestion engines may be arranged to import event information from various sources, such as application/system health monitoring services, network security monitoring services, application log files, event aggregators, or the like. Accordingly, in some embodiments, ingestion engines may be arranged to employ one or more filters, parsers, transformers, interfaces, libraries, or the like, that may be directed to particular event sources. In some embodiments, ingestion engines may be arranged to associate one or more ingestion protocols or ingestion tools with particular event sources. For example, in some embodiments, an event aggregation application may publish an API that ingestion engines may employ to collect events. Likewise, for example, ingestion engines may be arranged to employ a custom log file parser that is directed to a customized event logging system. Accordingly, in some embodiments, ingestion engines may be arranged to employ instructions, filters, parsers, transformers, interfaces, libraries, or the like, provided or determined via configuration information for ingesting events. Thus, in some embodiments, ingestion engines may be arranged to be adaptable to local requirements or local circumstances that may change over time.

In one or more of the various embodiments, ingestion engine 404 may be arranged to store event information in a data store, such as event store 424. Accordingly, in some embodiments, analysis engines may be provided a historical record of some or all events that have been ingested by ingestion engines.

In one or more of the various embodiments, analysis engine 402 may be arranged to evaluate some or all events to determine if some events may be ignored or otherwise automatically resolved while other events may be determined to require human intervention or otherwise be escalated. One of ordinary skill in the art will appreciate that classifying events may include categorizing events into two or more categories depending on local requirements or local circumstances. Accordingly, for brevity and clarity, analysis engines are described in terms of classifying events as false positive events or positive events, however, innovations disclosed herein are not so limited and analysis engines may be arranged to classify events using classification schemes that go beyond binary classification.

Also, in some embodiments, analysis engines may be arranged to associate, determine, or collect various scores, such as severity scores, priority scores, risk-scores, or the like for events. In some cases, analysis engines may be arranged to generate prompts or enhance prompts that may be used by one or more agents for conducting some or all of the analysis operations.

In some embodiments, analysis engines may be arranged to employ one or more management agents, such as, management agents 412 to begin or manage the operations executed to classify events. In some embodiments, management agents may work with one or more action agents, such as action agents 414. In some embodiments, action agents may be arranged to perform one or more particular tasks as part of evaluating events.

In some embodiments, management agents or action agents may be arranged to direct analysis engines to access various internal services or external services to analyze events. In this example, for some embodiments, evaluation service 418, evaluation service 420, or evaluation service 422 may be considered to represent one or more internal services or external services that may be employed to contribute to the analysis of events. For example, in some embodiments, an action agent may direct the analysis engine to use an external service to provide a risk-score for a network address associated with an event. Accordingly, for some embodiments, an action agent may generate instructions that include one or more API calls to internal or external services to provide supplemental evaluation for event classification. Also, in some embodiments, one or more action agents may be arranged to execute APIs of internal services or external services direct from the context of the agent or large language model rather than relying on the analysis engine to execute the API calls.

In one or more of the various embodiments, if one or more events have been classified, analysis engines may be arranged to generate one or more reports, such as event reports 416. In some embodiments, event reports may be considered machine-readable information that other reporting tools or reporting services may employ to generate reports, visualizations, interactive reports, or the like. Also, in some embodiments, ingestion engines, repository engines, or the like may be arranged to generate one or more user interfaces that enable interactive reports to be presented using data or other information included in event reports 416.

For example, in some embodiments, analysis engines may be arranged to collect or determine one or more severity scores for one or more events based on one or more prompts (or agent) that have been modified or adapted to include one or more context records selected for the particular analysis operations. In some embodiments, the modified or enhanced prompts may be used with agents or generative AI systems to evaluate or classify events as described herein.

Further, in some embodiments, system 400 may be arranged to include context repository 426. In some embodiments, context repositories, such as context repository 426 may be arranged to organize or manage one or more context records that include supplemental information that may be provided to analysis engines. In some embodiments, analysis engine 402 may be arranged to obtain context records from context repositories that include context information for use in evaluating or analyzing events, incidents, or the like. Likewise, in some embodiments, information from context repositories may be incorporated in agents that employ the information while performing operations. In practice, for some embodiments, the supplemental information may be included in prompts or otherwise provided to generative AI models to provide or supplement the AI model's real-time context memory that may be referenced during operation.

Accordingly, in some embodiments, context repositories may be used to curate, organize, or manage the supplement information. In some embodiments, context repositories may be arranged to perform various actions to improve the management of information used with generative AI models or agents. In some embodiments, this may include, associating context records with entities, tracking the age of records, monitoring record relevance, associating records with subjects, associating records with locations, or the like. For example, in some embodiments, analysis engines may be arranged to employ context repositories to associate one or more records with particular users, persons, machines, hosts, applications, services, time-of-day, day-of-week, subjects, tags, labels, or the like.

In some embodiments, repository engines, such as repository engine 430 may be arranged to perform actions to support the operation, organization, or management of context repositories, such as context repository 430.

Further, in some embodiments, context repository 426 may be arranged to support collaborative knowledge management across multiple teams or organizational units in an organization. In one or more of the various embodiments, context repository 426 may be configured to maintain one or more separate permission-based knowledge domains to enable controlled sharing of context records between teams.

Also, in some embodiments, context repositories may be arranged to use version control mechanisms for tracking modifications to some or all context records over time to enable rollback capabilities or audit trails that show how knowledge may have evolved within the organization.

Also, in some embodiments, context repository 426 may be arranged to maintain relationships with external threat intelligence platforms, such as service 418, service 420, service 422, or the like to automatically synchronize relevant external intelligence with internal context records while preserving appropriate source attribution and source confidence metrics. Thus, in some embodiments, context repository 426 may be an active component in the organizational security knowledge ecosystem that may continuously evolve through both automated processes and human expertise contributions.

Further, in some embodiments, systems, such as system 400 may include one or more telemetry engines, such as telemetry engine 428. In some embodiments, telemetry engines may be arranged to monitor or evaluate interactions with applications or user interfaces such as user interface 432, user interface 436, or the like. In some embodiments, this may include monitoring how users or even other applications may interact with user interfaces, interactive reports, various applications, or one or more system features.

In some embodiments, user interfaces, such as user interface 432 or user interface 436 may include various windows, controls, or other user interface features. In some embodiments, user interfaces may include various user interface panels, such as panel 434, panel 438, or the like. For example, in some embodiments, panel 434, or the like may represent a user interface that enables users, such as security analysts, to review and interact with event reports that may be generated by analysis engines for one or more security incidents. Further, in some embodiments, element 440, element 442, element 444, element 446, or the like may be considered to represent various user interface elements, controls, buttons, list items, report features, user interface components, displayed content, formatted content, or the like that may be included in user interfaces.

Also, for example, for some embodiments, user interface 436 may be considered a user interface that enables administrative users to work with context repositories. For example, panel 438 may be used to select, generate, or modify candidate context records, queries, context repository organization, context repository schemas, or the like for user interface 436. For example, display panel 438 may be used to display candidate context records sorted based on inferred importance, value, or the like. Likewise, in some embodiments, panels such as panel 438 may be used to display context repository schema information, context records, context record meta-data, display reports regarding context records and their relevance to pending or previous incident investigations, or the like.

Also, in some embodiments, display panel 434 may be employed to display event reports or information from event reports. In some cases, these may be dashboard-like presentations that display the security activity associated with one or more monitored networks or applications. In some embodiments, panels such as panel 434 may display ordered lists of events, event notifications, recommended resolution actions, or the like that may be associated with security events incident investigations or other activities.

In some embodiments, analysis engines, repository engines, telemetry engines, ingestion engines, or the like may be arranged to generate or display user interfaces, such as user interface 432 or user interface 436 to users using one or more of video interface 242, projector 246, display 250, or the like, of a client computer, such as client computer 200. Similarly, in some embodiments, analysis engine 402, repository engine 430, or ingestion engine 404 may be arranged to generate or display user interface 432, user interface 436, or the like to users using a one or more of input/output interface 338, display 350, audio interface 356, or the like, of a network computer, such as network computer 300.

In some embodiments, panel 434 may be arranged to display a rank ordered list of event reports or investigation results based on operations performed by analysis engine 402 or repository engine 430. Note, in some embodiments, one of ordinary skill in the art will appreciate that organizations may have significant control or influence over the particular ranking criteria. For example, in some cases, one or more event report results may be considered more important than others.

In some embodiments, analysis engines, repository engines, ingestion engines, or the like may be arranged to collect various telemetry or other metrics associated with user interactions with user interfaces. In some embodiments, telemetry may include tracking or monitoring if users may be in agreement with events, context records, context repository organization, event report arrangement/organization, or the like. In some embodiments, analysis engines, repository engines, ingestion engines, or the like may be enabled to employ telemetry information or telemetry metrics collected or determined by telemetry engines, such as telemetry engine 428. In some embodiments, telemetry engines may be separate from analysis engines, repository engines, ingestion engines, or the like as shown here. Also, in some embodiments, telemetry engines may be part of or otherwise embedded in analysis engines, repository engines, ingestion engines, or the like.

Also, in one or more embodiments, various types of collected user telemetry may include a user's selection or non-selection of one or more particular elements or content in a display panel, pointing device (mouse) hover time over particular content or elements in a display panel, user dwell time between actions in a display panel, dwell time for viewing a display panel by a user, and the like.

In one or more of the various embodiments, analysis engines, repository engines, ingestion engines, or the like may be arranged to monitor telemetry information associated with one or more users.

Accordingly, in some embodiments, analysis engines, repository engines, ingestion engines, or the like may be arranged to provide one or more user interface facilities to collect direct feedback from one or more of the users that may interact with information displayed in the one or more user interfaces. For example, in some embodiments, user interfaces may include controls that enable authorized users to grade one or more event reports, recommended changes to context repository schemas, candidate context records, or the like.

In some embodiments, grades or scores may be binary (e.g., like/dislike), discrete (e.g., one-four stars, letter grades), continuous values, or the like.

Also, in one or more of the various embodiments, analysis engines, repository engines, ingestion engines, or the like may be arranged to provide user interfaces that monitor how users interact with input information, events, event reports, recommend resolution actions, or the like. In some embodiments, telemetry information employed to monitor user preferences may be based on monitoring user interactions as well as direct feedback. Accordingly, in some embodiments, input information, events, event reports, recommend resolution actions, or the like, that may appear well-formed but are ignored or discarded by users may be inferred to be poorly received. For example, for some embodiments, if the top ranked results or events provided in response to user actions, user queries, or the like, are ignored or lower ranked results are favored by users, it may be inferred that there may be a problem with the data or the display of the data.

Further, in some embodiments, analysis engines, repository engines, ingestion engines, or the like may be arranged to receive telemetry information from other services or applications. Accordingly, in one or more of the various embodiments, analysis engines, repository engines, ingestion engines, or the like may not be required to directly monitor activity associated with the input information, events, event reports, recommend resolution actions, or the like. For example, for some embodiments, user interfaces, such as user interface 432 or user interface 436 may be displayed to users via desktop computer applications, mobile applications, web-based applications, or the like. In some embodiments, such applications may collect the telemetry information and provide some or all it to analysis engines, repository engines, ingestion engines, or the like rather than requiring the analysis engines, repository engines, ingestion engines, or the like to include monitoring facilities on user-facing applications.

Accordingly, in some embodiments, analysis engine 402, repository engine 430, ingestion engine 404, or the like may be arranged to collect metrics or telemetry associated with user interactions with user interface 432 or user interface 436 using a one or more of input/output interface 238, cameras 240, touch interface 244, keypad 252, audio interface 256, GPS, 258, open air gesture interface 260, haptic interface 264, pointing device interface 266, or the like, of a client computer, such as client computer 200. Similarly, in some embodiments, analysis engine 402, repository engine 430, ingestion engine 404, or the like may be arranged to collect metrics or telemetry associated with user interactions with user interface 432, or user interface 436 using a one or more of input/output interface 338, GPS 340, keyboard 352, audio interface 356, pointing device interface 358, or the like, of a network computer, such as network computer 300.

In some embodiments, analysis engines, repository engines, ingestion engines, or the like may be arranged to track mouse movement, eye movement, keystrokes, or the like, to determine how users may interact with information (e.g., input information, events, event reports, recommended resolution actions, context records, context repository organization, context repository schemas, or the like) displayed in user interfaces. Accordingly, in some embodiments, analysis engines, repository engines, ingestion engines, or the like may be arranged to evaluate at least the quality of various investigation recommendations, schema changes, context record selection, report characteristics, or the like based on how users interact with them. For example, if users consistently select or otherwise favor interacting with items or events ranked lower than others, it may indicate that one or more models performing the ranking or item selection may be experiencing diminished or diminishing effectiveness. Likewise, in some embodiments, users may reject or ignore event classifications, analysis report results, suggested actions, context record suggestions, context repository organization recommendations, or the like which may indicate that one or more associated models or systems may be experiencing diminished or diminishing effectiveness.

In some embodiments, analysis engines, repository engines, ingestion engines, or the like may be arranged to associate a performance score with user interfaces used in the system based on the user interaction metrics or telemetry. Accordingly, in some embodiments, if the performance score associated with a user interface or user interface element falls below a defined threshold value, analysis engines, repository engines, ingestion engines, or the like may be arranged to suspend those user interfaces (or portions thereof) from operation. Or, in some embodiments, analysis engines, repository engines, ingestion engines, or the like may be arranged to automatically modify the deficient user interfaces.

Also, in some embodiments, telemetry engines may be arranged to collect or determine telemetry information that includes user telemetry, user feedback, or telemetry metrics that may be used to dynamically transform user interfaces, display panels, and the like. The dynamic transformation may include arrangement, re-arrangement, elimination, addition, or adaptation of content and visual elements in user interfaces and display panels based on at least the collected telemetry information.

Additionally, in some embodiments, telemetry engines may collect metrics associated with the one or more user interactions with the system including content within the user interfaces and display panels. In some embodiments, user profiles may be configured to dynamically include user interface preferences based on collected user telemetry metrics and user feedback. Accordingly, in some embodiments, analysis engines, repository engines, ingestion engines, or the like may dynamically change the visual appearance of the user interfaces to improve the efficiency and effectiveness of the system or its user interfaces for the user. Accordingly, in some embodiments, analysis engines, repository engines, or ingestion engines may be arranged to dynamically select, position, size, shape, remove, hide, inactivate, disable, highlight, or style one or more visual user interface components such as display panels, controls, elements and content based on one or more of user telemetry metrics and user feedback. For example, if user interactions with the user interface are tracked focusing on or navigating to particular user interface views, components or user interface panels, analysis engines, repository engines, or ingestion engines may be arranged to dynamically highlight or size the preferred user interface elements and/or display panels. For example, if users are determined to rarely interact with a display panel such as display panel 434, analysis engines, repository engines, ingestion engines, or the like may be arranged to dynamically reduce the size, diminish the shape, disable its controls, and re-position display panel 434 by displaying a smaller sized greyed out version of display panel 434 below other display panels.

Also, in some embodiments, analysis engines, repository engines, ingestion engines, or the like may be arranged to adapt user interfaces based on the size/type of display, input methods, user status, or the like. For example, in some embodiments, if a user is determined to be operating using a mobile device, one or more user interface elements may be dynamically positioned differently. In some cases, for some embodiments, depending on the display type or display size, one or more user interface elements may be hidden from view.

Accordingly, in some embodiments, analysis engines, repository engines, ingestion engines, or the like may be arranged to tangibly modify user interfaces, display panels, interactive reports, input collection, input selection, input data represent, context records, context repository organization, context repository schemas, or the like, based on the efficient and effective performance of processes and/or activities associated with various types input information, events, context records, context repositories, context repository schema, or the like as determined by telemetry information, or the like.

Figure 5:
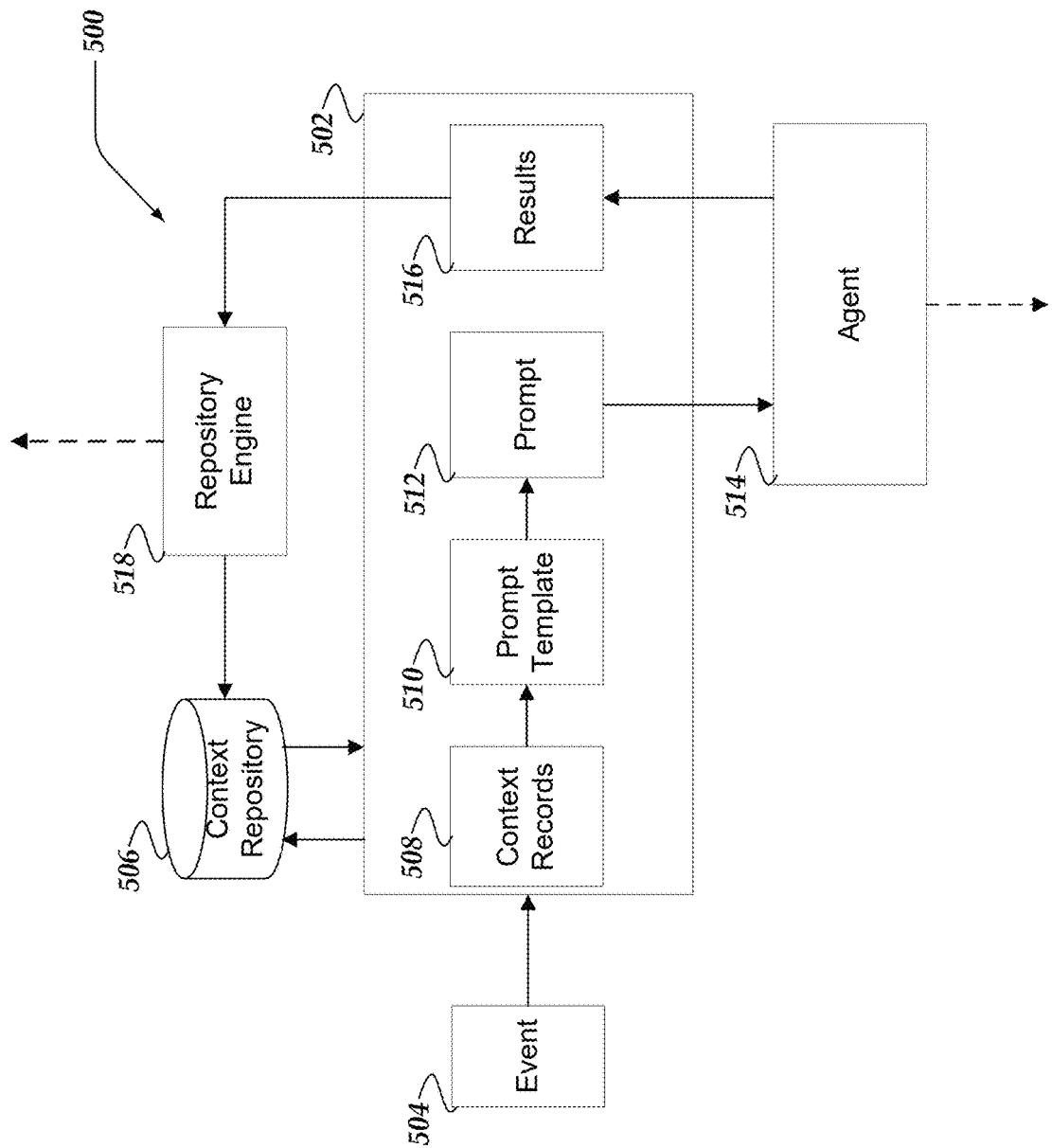
FIG. 5 illustrates a logical schematic of a system for context repository management in accordance with one or more of the various embodiments.

FIG. 5 illustrates a logical schematic of system 500 for context repository management in accordance with one or more of the various embodiments.

In some embodiments, analysis engines, such as analysis engine 502 may be arranged to obtain one or more context records from a context repository, such as context repository 506. In some embodiments, analysis engines may be arranged to generate one or more queries based on the event (event information). For example, in some embodiments, events in a network security system may include event information that may include host names, network addresses, usernames, activity descriptions, or the like, that may be used to build queries for searching context repositories for relevant context records. In some embodiments, analysis engines may be arranged to generate one or more prompts that include some or all of the event information such that a generative AI model may be used to suggest one or more appropriate queries. Likewise, in some embodiments, analysis engines may be arranged to use generative AI models to propose some or all of the context records.

Further, in some embodiments, analysis engines may be arranged to employ conventional NLP methods to determine one or more context records that may be associated with a given event. For example, in some embodiments, analysis engines may be arranged to execute one or more similarity searches on description or label texts that may be associated with context records. Further, in some embodiments, analysis engines may be arranged to use one or more hybrid techniques for determining context records that may combine one or more of heuristics, conventional NLP, large language models, generative AI, or the like for collecting context records from context repositories.

In this example, for some embodiments, analysis engine 502 may be provided event 504. Accordingly, in this example, for some embodiments, analysis engine 502 may use one or more of the methods disclosed above for collecting one or more context records, such as context records 508 from context repository 506.

Further, in this example, for some embodiments, analysis engine 502 may be arranged to specify, generate, or choose as prompt template, such as prompt template 510. In some embodiments, prompt templates may be literal templates that include markup or tags that indicate where particular values may be substituted or injected into the template. Also, in some embodiments, choosing or generating prompt templates may include using one or more frameworks, rules, or instructions to generate information formatted for submission to one or more models rather than being limited to substituting text into a template document. For example, in some cases, this may include gathering or generating API parameter values, or the like rather than substituting or injecting text into a template document.

Further, in this example, for some embodiments, analysis engine 502 may be arranged to apply generated prompts, such as prompt 512 for directing or generating one or more agents, such as agent 514. In some embodiments, agents may be separate processes or services that semi-autonomously interact with one or more external data sources, services, generative AI models, or the like as directed or guided by prompt 512. Accordingly, in some embodiments, agent 514 may generate results, such as results 516 that may be provided to analysis engine 502.

Also, in some embodiments, results 516 may include one or more results that may be chosen to be context records. Accordingly, in some embodiments, analysis engines or repository engines may be arranged to select one or more portions of the results to include in context repository 506.

Accordingly, in some embodiments, information discovered during the course of normal operations, such as investigations, incident analysis, or the like may be collected and stored in context repositories. Thus, in some embodiments, analysis engines or repository engines may be arranged to continuously update context repositories. Note, for brevity or clarity repository engines may be referred to a being separate from analysis engines. However, one of ordinary skill in the art will appreciate that in some embodiments some or all of the actions or operations described for repository engines may be performed by analysis engines, or the like. For example, a repository engine may be implemented as a library or module within an analysis engine. Or, alternatively, for some embodiments, some or all of the actions or operations described for repository engines may be performed by one or more processes or services that may be separate from the analysis engine.

In some embodiments, analysis engines or other services (e.g., repository engines) may be configured to continuously or periodically seek out information from other sources including external data sources. Accordingly, in some embodiments, context repositories may be updated based on information collected from various configured sources. In some embodiments, repository engines, such as repository engine 518 may be configured to examine one or more other data sources to select information that may be suitable for inclusion in context repository 506. For example, in some embodiments, a repository engine may be configured monitor user directories, such as LDAP (Lightweight Directory Access Protocol) servers, or the like to keep track of authorized users, user roles, credential information, user groups, organizational units, or the like. For example, if a repository engine identifies one or more users (new users) that are not included as entities in the context repository, it may be configured to automatically include those new users in the context repository.

Similarly, in some embodiments, repository engines may be arranged to integrate with configuration databases, security information and event management (SIEM) systems, network monitors, or the like to obtain information about the network architecture, hosts, applications, or the like that may be operating in the network environment.

Further, in other subject matter domains, repository engines may be configured to collect candidate context records from various sources that may be relevant to the particular subject matter domain.

In one or more of the various embodiments, analysis engine 502 may be arranged to track utilization patterns of context records 508 to optimize repository performance. In some embodiments, analysis engines may maintain telemetry data regarding which context records are frequently accessed, which records contribute most significantly to successful investigations, which records may have diminishing relevance over time, or the like. Accordingly, in some embodiments, analysis engines may communicate with repository engine 518 to reprioritize records within context repository 506 based on these usage metrics. In some embodiments, context records may be assigned dynamic relevance scores (or degradation indicators) that evolve based on their utility in previous investigations, their temporal nature, or their relationship to frequently occurring event types. Further, in some embodiments, analysis engines may be arranged to generate one or more composite context records by consolidating similar or complementary individual context records to improve retrieval efficiency and analytical value during subsequent investigations. Thus, in some embodiments, context repository 506 becomes increasingly optimized as the system processes more events and collects more intelligence about the relative importance of different context records in specific analytical scenarios.

Figure 6:
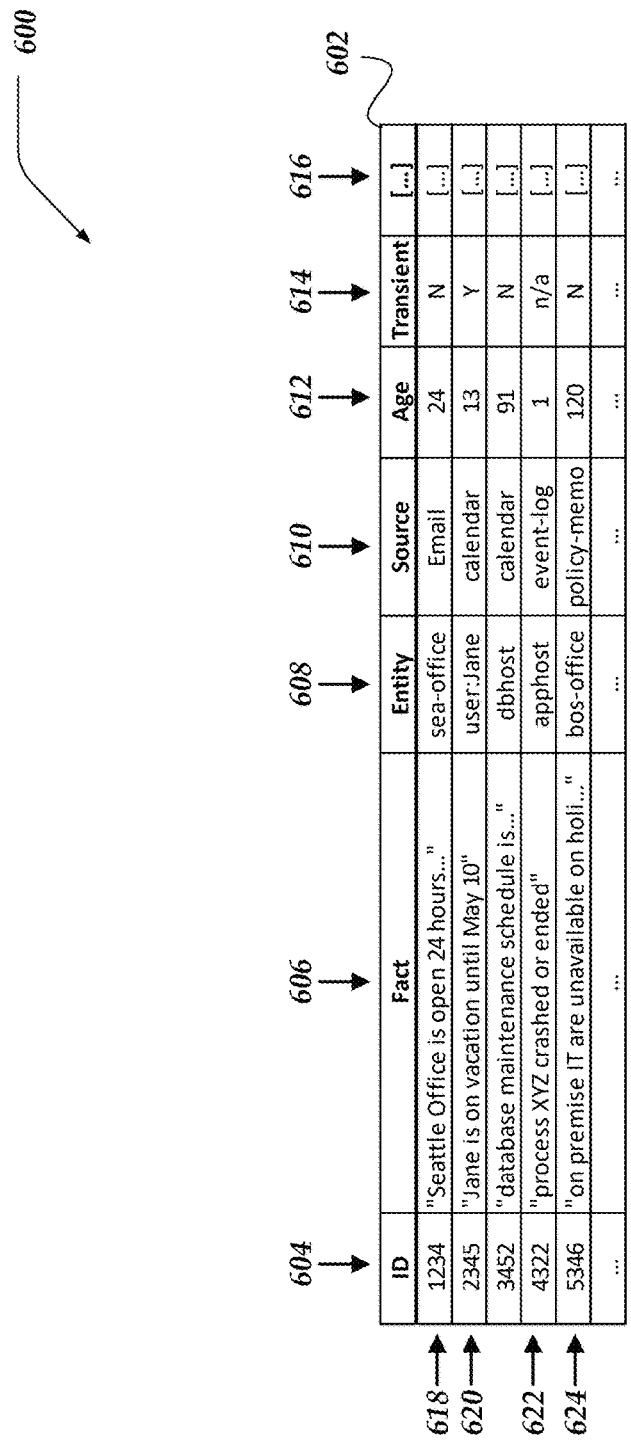
FIG. 6 illustrates a logical schematic of a context repository for context repository management in accordance with one or more of the various embodiments.

FIG. 6 illustrates a logical schematic of context repository 600 for context repository management in accordance with one or more of the various embodiments.

As described above, in some embodiments, context repositories may be arranged to store various context records for use by analysis engines or other applications. In this example, for some embodiments, context record table 602 represents one or more data structures that may be part of a context repository. Note, for brevity or clarity, context record table 602 is represented here as a table or table-like data structure. One of ordinary skill in the art will appreciate that the innovations herein anticipate other data structure may be used for representing context records, such as database tables, XML files, lists, trees, arrays, documents, or so on rather than being limited to a particular data structure or data format. Likewise, in some cases, for some embodiments, context repositories may include more than one table. Likewise, in some embodiments, context repositories may be organized differently than depicted here. For example, in some embodiments, context repositories may be organized such that entities, associated media (e.g., photographs, video clips, or the like), tag lists, or the like may be stored in separate tables rather than being included one table.

In this example, for some embodiments, table 602 includes columns for representing various features or characteristics of context records. Further, in some embodiments, one or more columns may be directed organizing or indexing context records to enable efficient or improved retrieval of relevant context records. In this example, for some embodiments, columns may include: column 604 for storing an identifier that may be associated each context record; column 606 for storing a text/natural language representation for the context record; column 608 for associating context records with one or more particular entities; column 610 for representing the source of the context record; column 612 for storing the age or other time based information (e.g., time since obtained, time last accessed, or the like); column 614 for storing an indicator that the context record should be considered transient; column 616 represents additional/alternative columns for storing information, such as tags, labels, record group information, confidence scores, importance scores, or the like. In some embodiments, table 602 may include one or more columns that reference other tables or data sources. Likewise, in some embodiments, context repository tables may include one or more columns for storing custom information. For example, in some embodiments, a column may be configured to store key-value pairs that may be added to or modified absent adding new columns.

As described above, in some embodiments, repository engines may be arranged to collect context records from various sources, such as email systems, calendar systems, document management systems, configuration databases, prior incidents, prior incident investigations, user provided information, event logs, or the like.

Accordingly, in this example, for some embodiments, the various rows included in table 602 may represent exemplar context records including: row 618 which may be considered to represent a fact (office hours) that may be determined from an email announcing the operational hours; row 620 which may be considered to represent a fact (Jane is on vacation) based on Jane's digital calendar; row 620 which may be considered to represent a fact (e.g., history of process crashes) based on one or more event logs or system logs; row 624 which may be considered to represent a fact (on-premise IT personnel should be absent) based on a policy memorandum document; or the like.

Further, in some embodiments, context repositories may include context records that may be associated or defined by media other than natural text as shown here. For example, some context records may be associated with images, photographs, audio recordings, or the like that may provide support for the context record. Likewise, in some embodiments, other media may comprise the fact description rather than being limited to a natural language description. Accordingly, in some embodiments, repository engines or analysis engines may be arranged to load libraries, plug-ins, or extension modules for processing different types of media or data formats to account for local circumstances or local requirements.

Also, in some embodiments, repository engines may be arranged to continuously or periodically execute one or more actions to evaluate context records that may be stored in context repositories. In some embodiments, repository engines may be arranged to identify one or more context records that may be removed from the context repository based on various criteria or characteristics of the context record entries. Accordingly, in some embodiments, repository engines may compare one or more characteristics of the context records to determine if any or all of the context record may be removed, updated, or the like.

In some embodiments, repository engines may be configured to preserve "removed" context records by using soft-deletes, tags (e.g., mark context records as removed), labels (e.g., identify context records as removed), archival practices, or the like such that removed context records may be preserved for subsequent review before permanent deletion.

In some embodiments, this may include de-duplication that removes redundant context records. Accordingly, in some embodiments, repository engines may be arranged to examine context records to identify one or more redundant or duplicate context records. In some embodiments, repository engines may be configured to aggregate one or more context records rather than discarding duplicates. In some cases, context repositories may include fields or columns that indicate certain related or associated context records may be aggregated. Also, in some embodiments, repository engines may be arranged to maintain the individual context records and generate one or more records that represent aggregated records.

In some embodiments, repository engines may be arranged to apply one or more context repository models that may be arranged to predict or infer one or more context record characteristics or meta-data based on some or all of the sources associated with the context record of interest. In some embodiments, this may include associating a context record with one or more entities based on inferences or predictions made by context repository models. Also, in some embodiments, repository engines may be arranged to update context record meta-data as more information may be discovered about a particular context record. In some cases, for some embodiments, repository engines may use the context repository models to predict or infer one or more context record meta-data values such that eventually the number of types of collect context records may suggest additional meta-data that may be associated with the particular records. Likewise, for example, repository engines may be arranged to refine context repositories entries based on subsequently obtained information. For example, some context record fields may be indeterminable when the context record is first collected. Accordingly, for example, subsequently discovered context record or other information may be one or more previously undetermined or indeterminable context record fields to be determined. For example, in some embodiments, initially a context record may be determined to be associated with a sub-network or server class rather being associated with a particular network address or host because of a lack of information. Accordingly, for example, subsequently obtained context records may provide additional information that may enable the particular network address or host name to be determined for context records that may be missing such information. Further, in some embodiments, repository engines or analysis engine may be arranged to generate one or more user interfaces that enable users to supply or modify context record fields as needed.

Also, in some embodiments, repository engines may be arranged to identify one or more context records that may include one or more anomalous characteristics or features. Accordingly, in some embodiments, repository engines may be arranged to generate one or more notifications or reports that may be communicated to administrators to enable them to review the putative anomalous context records.

Further, in one or more of the various embodiments, repository engines may be arranged to continuously or periodically execute one or more actions to evaluate context records that may be stored in context repositories. In some embodiments, repository engines may be arranged to identify one or more context records that may be removed from the context repository based on various criteria or characteristics of the context record entries.

Accordingly, in some embodiments, repository engines may compare one or more characteristics of the context records to determine if any of the context records may be removed, updated, or otherwise modified. In some embodiments, repository engines may be configured to preserve "removed" context records by using soft-deletes, tags (e.g., mark context records as removed), labels (e.g., identify context records as removed), archival practices, or the like such that removed context records may be preserved for subsequent review before permanent deletion. In some embodiments, this may include de-duplication that removes redundant context records.

In some embodiments, repository engines may be arranged to examine context records to identify one or more redundant or duplicate context records. In some embodiments, repository engines may be configured to aggregate one or more context records rather than discarding duplicates. In some cases, context repositories may include fields or columns that indicate certain related or associated context records may be aggregated. Also, in some embodiments, repository engines may be arranged to maintain the individual context records and generate one or more records that represent aggregated records.

Further, in one or more of the various embodiments, context record table 602 may be arranged to support comprehensive context provenance tracking by maintaining detailed metadata about the lifecycle of each context record. In some embodiments, repository engines may be configured to automatically populate provenance-related fields during context record creation, including timestamps in column 612 that capture record creation timestamps and modification history, source attribution data in column 610 that documents origination sources, and additional provenance metadata in column 616 such as update sequences and verification status indicators. Accordingly, in some embodiments, repository engines may leverage this provenance information to maintain robust audit trails that enable administrators to trace the complete evolution of context records from initial collection through subsequent modifications or validations. For example, in some embodiments, if a context record undergoes evaluation or update operations, repository engines may automatically generate provenance entries that document the specific changes made, the timestamp of modifications, and the verification status of the updated information, creating a comprehensive audit trail that supports governance requirements or enables rollback capabilities if necessary. Thus, in some embodiments, the structured provenance data maintained in context record table 602 provides the foundation for accountability and traceability throughout the context repository management system.

Figure 7:
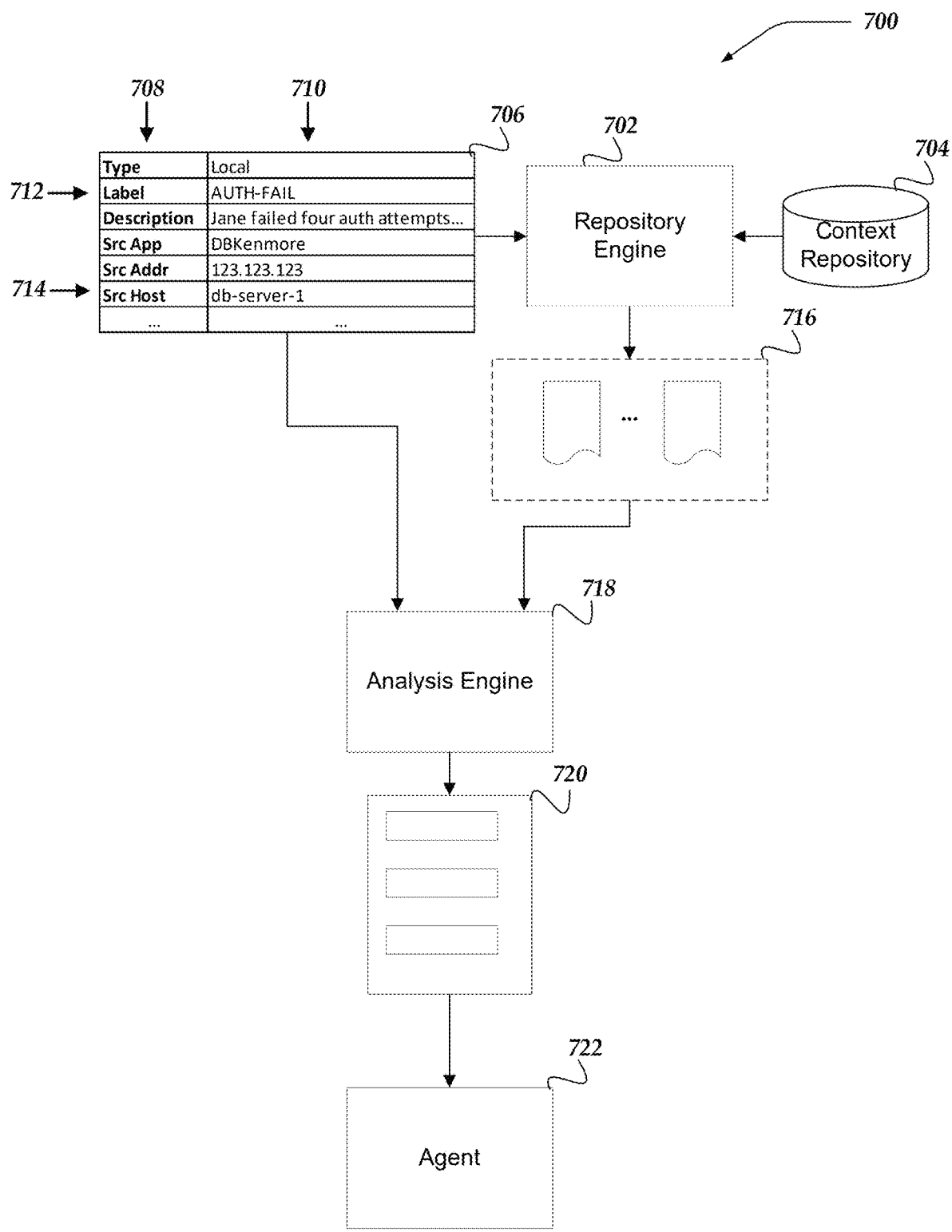
FIG. 7 illustrates a logical schematic of a system for context repository management in accordance with one or more of the various embodiments.

FIG. 7 illustrates a logical schematic of system 700 for context repository management in accordance with one or more of the various embodiments. In some embodiments, system 700 may be considered to represent a portion of a security analysis server computer, or the like.

As described above, in some embodiments, repository engines, such as repository engine 702 may be arranged to manage the organization or access to various context records that may be stored in context repositories, such as context repository 704.

In some embodiments, repository engines may be arranged to receive input information, such as event 706 that may be used to identify or collect context records that may be relevant to an analysis associated with the input information.

In this example, for some embodiments, event 706 may be represented as a data structure with column 708 for listing field labels and column 710 for storing field values. One of ordinary skill in the art will appreciate that the content or format of input information may vary depending on the underlying application or purposes behind the analysis. In this example, event 706 may be assumed to an event, notification, or alert generated by a network monitor or other security monitoring service that may be configured to submit events to system 700.

In this example, for some embodiments, event 706 includes various fields for storing values associated with the incident associated with the event. Accordingly, in this example, the various fields may include field 712 for storing a label that may be associated with the event; field 714 for storing the host name(s) of computers or servers that may be associated with the event; or the like. For brevity and clarity, the remaining fields in event 706 are not described. One of ordinary skill in the art will appreciate that the fields or other information associated with input information such as event 706 may vary depending the particular source or purpose of the input information. However, one of ordinary skill in the art will appreciate that the example here is at least sufficient to disclose the innovations herein.

In some embodiments, repository engine 702 may be arranged to use the input information to identify and provide one or more context records that may be associated with the input information. Accordingly, in this example, for some embodiments, context records 716 may represent context records collected from context repository 704 based on event 706. In some embodiments, repository engines may be arranged to use one or more methods for generating context records queries based on input information. For example, in some embodiments, repository engines may be configured to recognize that particular fields in event 706 may represent entities that may be associated with context records. For example, field 714 represents the host name of the server or computer that may be associated with the event. Accordingly, in some embodiments, repository engines may be configured to retrieve context records that may be associated the entity "db-server-1". Likewise, in this example, the application, network address, or the like may be employed to select relevant context records. Note, in practice there may be more or fewer entity fields (e.g., users, geographic location, or the like) as well as time fields, or the like, that may be employed for identifying relevant context records.

In some embodiments, repository engines may use query templates that be based on a query language that is supported by the context repository such that entity names, time ranges, tag values, or other relevant values may be inserted into the query statements.

Also, in some embodiments, repository engines may be arranged to use generative AI or other AI models to recommend which fields should be used for collecting relevant context records. For example, in some embodiments, repository engines may be arranged to use a prompt that requests that a generative AI model generate one or more queries for retrieving relevant context records based on the schema of the context repository and the content of the input information. In some embodiments, in some embodiments, repository engines may be arranged to use a combination of methods for generating context record queries. For example, one or more well-known fields (e.g., username, host name, or the like) may be associated with pre-made (e.g., hard coded) query expression templates while generative AI models may be used to suggest additional queries. In some cases, for some embodiments, particular events or event types may be associated with particular queries or query templates.

In this example, for some embodiments, context records 716 represent collections of context records that were retrieved from context repository 704 based on queries associated with event 706.

Also, in some embodiments, analysis engines may be arranged to create one or more prompts that may be enhanced to include context record summaries and entity relationship mappings such that the one or more enhanced prompts include one or more of threat assessment templates, investigation guidance frameworks, or analytical reasoning structures. Accordingly, in some embodiments, the enhanced prompts may be used the one or more enhanced prompts to train severity assessment models for improved event classification or generate one or more agents for classifying events.

Accordingly, in some embodiments, the input information (e.g., event 706) and the relevant context records (e.g., context records 716) may be provided to an analysis engine, such as analysis engine 718. In some embodiments, analysis engines, such as analysis engine 718 may be arranged to generate one or more generative AI prompts that combine the event information and the relevant context records into the one or more prompts, such as prompt 720. Thus, in some embodiments, the combined prompt may be used to create or direct an agent such as agent 722 to perform the desired analysis. In this example, for some embodiments, the agent may be used to evaluate if event 706 may be dangerous or otherwise anomalous such that it should be brought to the immediate attention of a security analyst or other service.

Figure 8:
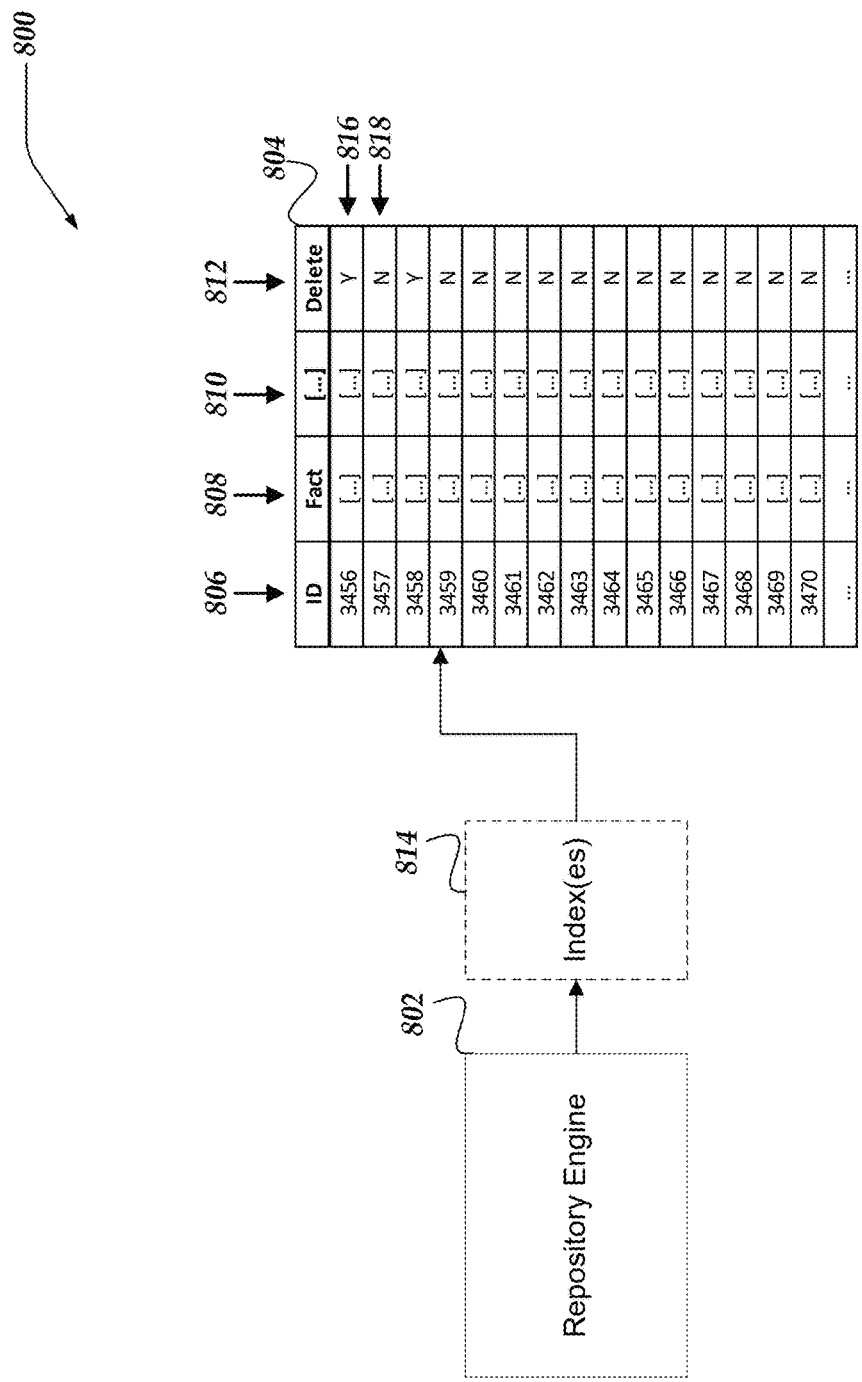
FIG. 8 illustrates a logical schematic of a system for context repository management in accordance with one or more of the various embodiments.

FIG. 8 illustrates a logical schematic of system 800 for context repository management in accordance with one or more of the various embodiments.

As described above, in some embodiments, repository engines may be arranged collect information from various sources, such as including security information and event management (SIEM) systems, threat intelligence platforms, network monitoring logs, endpoint detection and response (EDR) tools, completed security investigations, resolved incidents, knowledge bases of known vulnerabilities, user behavior analytics, system logs, external threat feeds, regulatory compliance documentation, historical attack patterns, security vendor advisories, internal security team documentation, or the like. Accordingly, in some embodiments, repository engines may provide context records associated with pending investigations to analysis engines. However, in some embodiments, context repositories may grow to be unwieldy or overburdened with stale data. Accordingly, in some embodiments, repository engines may be arranged to continuously or periodically prune or groom context repositories.

In this example, for some embodiments, repository engine 802 may be arranged to generate, maintain, or use one or more indexes, such as indexes 814 that enable rapid and secure access to context records stored in repositories, such as repository 804.

In some embodiments, context repositories, such as repository 804 may include or employ schemas, formats, layouts, or the like for logically representing or presenting context records. In this example, for some embodiments, repository 802 is illustrated as including various columns, such as: column 806 for storing identifiers that may be used to reference individual context records; column 808 for storing the content of the context record; column 810 representing one or more additional columns for storing meta-data or other information associated with a context record, such as aging information, origination/source, attribution, usage count, tags, hints, group indicators, confidence scores, access rules/restrictions, or the like; column 812 for indicating that context record may be eligible for discarding or pruning; or the like.

In some embodiments, indexes 814 may be considered to provide data structures that include links, references, associations, or the like for producing logical data structures, such as trees, lists, relationships, or the like, for accessing context records. Accordingly, in some embodiments, repository engines may be arranged to employ instructions, rules, libraries, plug-ins, or the like provided via configuration information for producing indexes that conform to local requirements or local circumstances.

Also, in this example, for some embodiments, context record 816 may be considered to represent a context record and its associated meta-data or supporting data. Likewise, in this example, context record 818 represents the context record and its associated meta-data or supporting data. However, in this example, record 818 is marked for deletion such that it may be omitted from being selected or returned to analysis engines in response to context queries. Further, in some embodiments, repository engines may be arranged to periodically sweep context repositories to identify and delete context records that may be marked for deletion. Also, in some embodiments, repository engines may be configured to delete context records on demand rather than marking them for deletion.

Generalized Operations

FIGS. 9-13 represent generalized operations for context repository management in accordance with one or more of the various embodiments. In one or more of the various embodiments, processes 900, 1000, 1100, 1200, and 1300 described in conjunction with FIGS. 9-13 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environments. However, embodiments are not so limited and various combinations of network computers, client computers, or the like may be utilized. Further, in one or more of the various embodiments, the processes described in conjunction with FIGS. 9-13 may be used for context repository management in accordance with at least one of the various embodiments or architectures such as those described in conjunction with FIGS. 1-8, and 14. Further, in one or more of the various embodiments, some or all of the actions performed by processes 900, 1000, 1100, 1200, and 1300 may be executed in part by analysis engine 322, repository engine 324, ingestion engine 326, agents 327, telemetry engine 328, or the like, running on one or more processors of one or more network computers.

Figure 9:
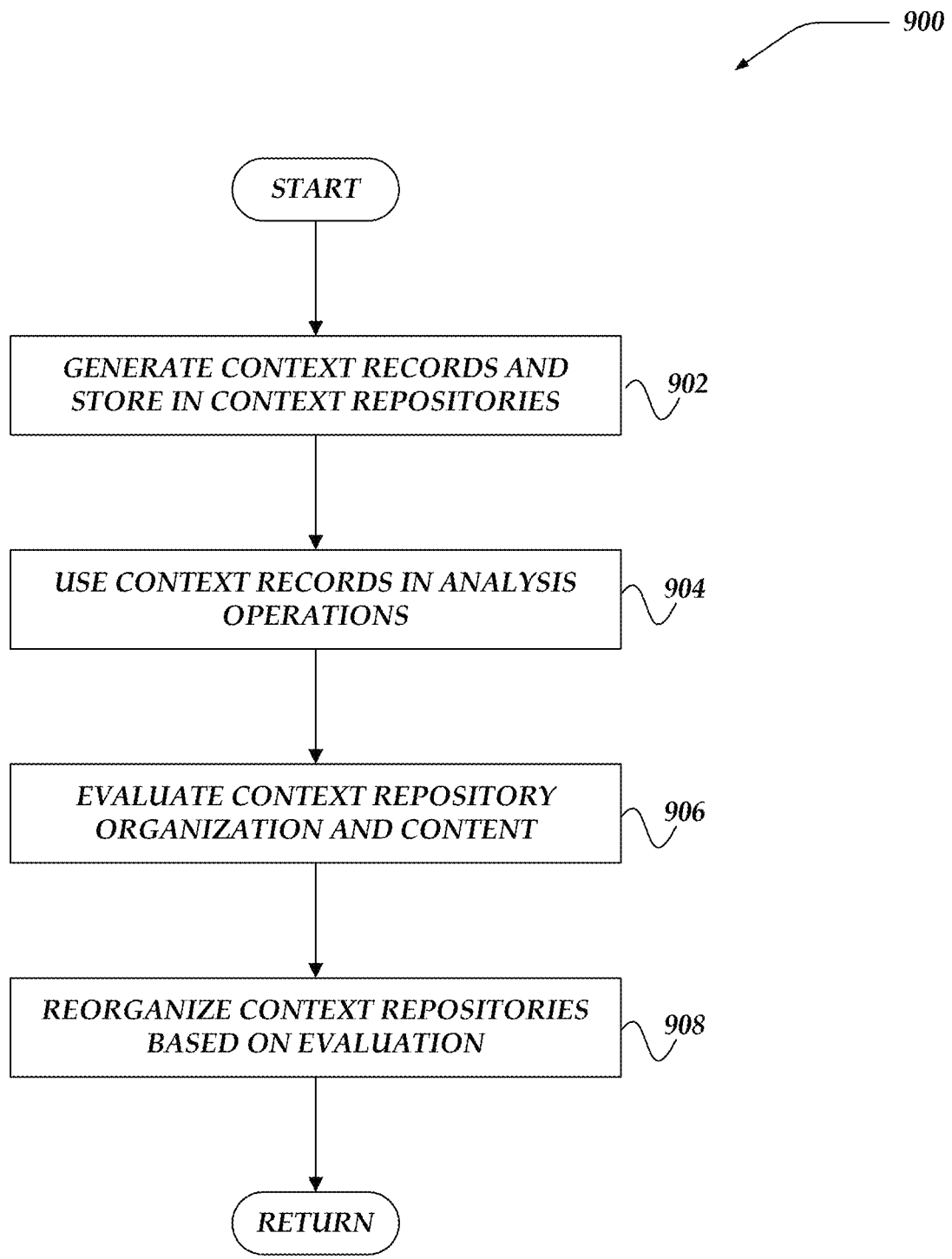
FIG. 9 illustrates an overview flowchart of a process for context repository management in accordance with one or more of the various embodiments.

FIG. 9 illustrates an overview flowchart of process 900 for context repository management in accordance with one or more of the various embodiments. After a start block, at block 902, in one or more of the various embodiments, analysis engines or repository engines may be arranged to generate one or more context records that may be stored in one or more context repositories.

In some embodiments, analysis engines may be arranged to extract context records from events, incidents, investigations, or security analyses conducted within monitored computing environments. In some embodiments, repository engines may be arranged to integrate with various data sources to collect candidate context records that provide supplemental information for security analyses. In some embodiments, repository engines may be arranged to process user-provided information to identify valuable context records based on specialized knowledge or experience. Accordingly, in some embodiments, repository engines may be arranged to transform collected information into structured context records with appropriate metadata, entity associations, or temporal attributes. In some embodiments, repository engines may be arranged to apply quality filters to ensure only reliable context records enter the repository. Accordingly, in some embodiments, repository engines may be arranged to establish appropriate relationships between new context records or existing repository content to maintain coherent knowledge organization.

At block 904, in one or more of the various embodiments, analysis engines may be arranged to use one or more context records in various analysis operations.

In some embodiments, analysis engines may be arranged to query context repositories to retrieve context records relevant to events under investigation based on entity associations, timestamps, or subject matter. In some embodiments, analysis engines may be arranged to incorporate context records into prompts provided to large language models or other generative AI systems to enhance security analysis capabilities. In some embodiments, repository engines may be arranged to prioritize context records based on relevance scores, confidence ratings, or recency metrics. These scores or ratings may be used to filter or select one or more context records for inclusion in analysis prompts. Accordingly, in some embodiments, analysis engines may be arranged to combine event information with relevant context records to establish comprehensive investigation context for more accurate assessment of security events.

In some embodiments, analysis engines may be arranged to reference historical context records from previous investigations to identify patterns or relationships across security incidents. Thus, in some embodiments, context records may significantly enhance analysis quality by providing crucial supplemental information that may not be available within event data alone.

At block 906, in one or more of the various embodiments, repository engines may be arranged to evaluate the context repository organization and content.

In some embodiments, repository engines may be arranged to periodically analyze repository metrics including utilization patterns, query performance, storage efficiency, or context record quality indicators. In some embodiments, repository engines may be arranged to identify redundant, outdated, or low-value context records that consume storage resources without providing meaningful analytical benefits. In some embodiments, repository engines may be arranged to evaluate schema effectiveness based on query patterns, entity relationship utilization, or metadata field coverage. Accordingly, in some embodiments, repository engines may be arranged to collect telemetry data about how analysts interact with context records during investigations to measure their practical utility. In some embodiments, repository engines may be arranged to assess context repository completeness by identifying coverage gaps across important entities, time periods, or security domains. Accordingly, in some embodiments, repository engines may be arranged to generate evaluation reports highlighting strengths, weaknesses, or improvement opportunities within the current repository organization.

At block 908, in one or more of the various embodiments, repository engines may be arranged to reorganize one or more context repositories based on the evaluation.

In some embodiments, repository engines may be arranged to implement schema optimizations that better align with observed usage patterns, entity relationships, or query requirements. In some embodiments, repository engines may be arranged to remove or archive context records determined to be obsolete, redundant, or below quality thresholds. In some embodiments, repository engines may be arranged to consolidate related context records to reduce fragmentation while preserving comprehensive coverage. Accordingly, in some embodiments, repository engines may be arranged to adjust indexing strategies to improve query performance for frequently accessed context record patterns. In some embodiments, repository engines may be arranged to refactor entity relationship models to better represent real-world security environments or emerging threat landscapes. Accordingly, in some embodiments, repository engines may be arranged to implement governance policies that ensure ongoing repository quality through automated maintenance processes. Thus, in some embodiments, repository engines may be arranged to continuously evolve context repository organization to maintain optimal performance, storage efficiency, or analytical effectiveness as security requirements change over time.

Next, in one or more of the various embodiments, control may be returned to a calling process.

Figure 10:
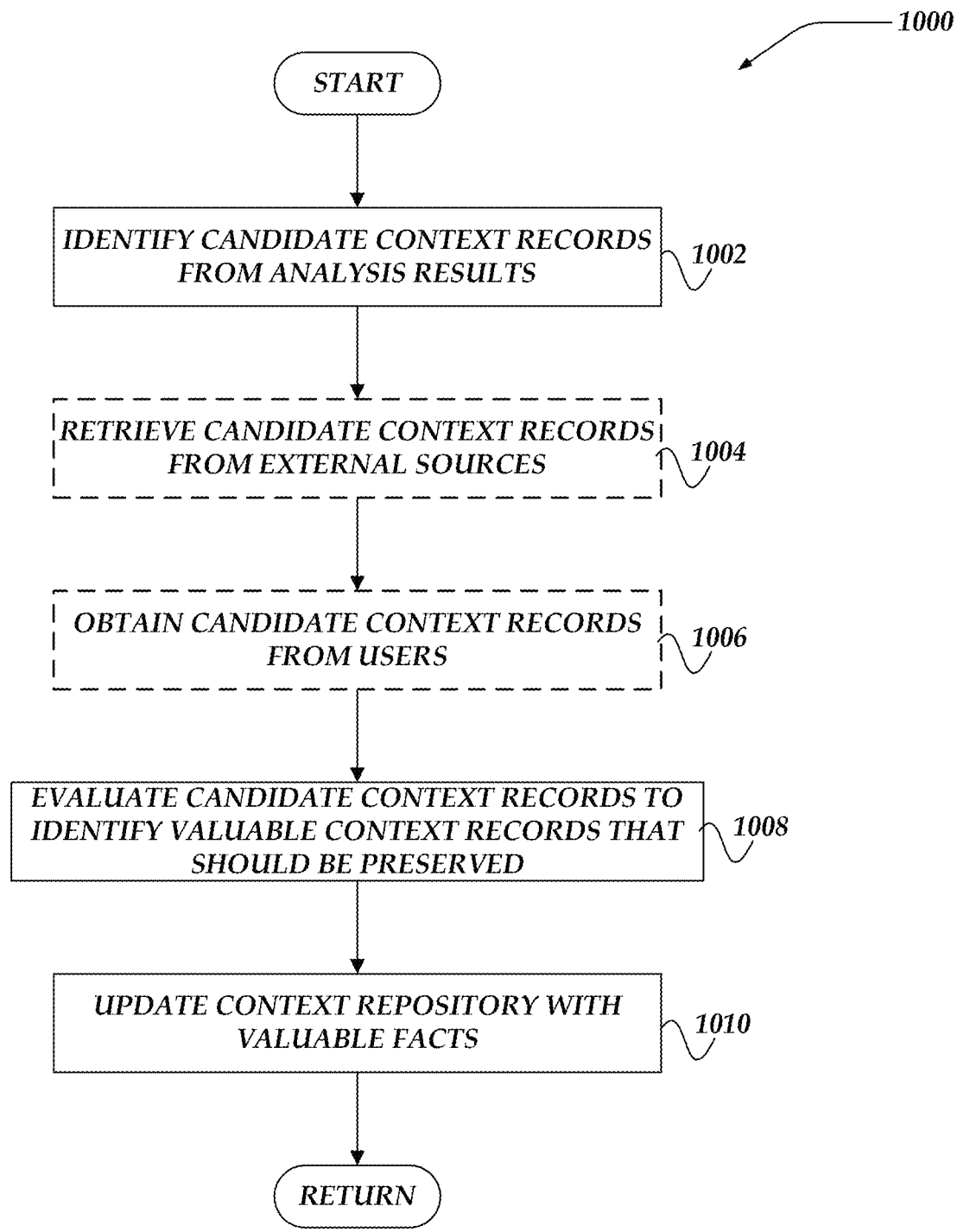
FIG. 10 illustrates a flowchart of a process for context repository management in accordance with one or more of the various embodiments.

FIG. 10 illustrates a flowchart of process 1000 for context repository management in accordance with one or more of the various embodiments. After a start block, at block 1002, in one or more of the various embodiments, analysis engines may be arranged to identify one or more candidate context records based on previous analysis results.

In some embodiments, analysis engines may be arranged to extract significant records from completed investigations, resolved incidents, classified events, or the like that demonstrated value in previous analyses. In some embodiments, repository engines may be configured to identify patterns across multiple investigations where particular context records contributed to accurate investigation results. In some embodiments, repository engines may be arranged to analyze which records were most frequently referenced during successful incident resolutions. Accordingly, in some embodiments, repository engines may be configured to prioritize context records that provided critical context for distinguishing between true positive or false positive security events. In some embodiments, repository engines may be arranged to preserve relationships between candidate context records or the investigations where they demonstrated utility. Accordingly, in some embodiments, repository engines may be configured to rank candidate context records based on their historical impact on investigation outcomes, relevance to common incident types, or applicability across multiple security domains.

Note, in other subject domains or application domains, criteria for selecting context records for inclusion in context repositories may be selected based on the particular domain of interest.

At block 1004, in one or more of the various embodiments, optionally, repository engines may be arranged to retrieve one or more candidate context records from one or more external sources.

In some embodiments, repository engines may be arranged to integrate with directory services, configuration management databases, security information and event management systems, threat intelligence platforms, network monitoring tools, or the like. In some cases, for some embodiments, repository engines may be configured to establish API or interface connections with one or more external systems to regularly collect updated information about users, hosts, applications, network resources, or the like that may be in the relevant networking environment.

In some embodiments, repository engines may be arranged to transform externally sourced data into normalized formats compatible with the context repository schema. Also, in some embodiments, repository engines may be configured to apply source-specific quality filters to ensure external facts meet minimum reliability standards before inclusion in a context record. In some embodiments, repository engines may be arranged to preserve source attribution metadata with each candidate record to enable source-based filtering or confidence scoring. Further, in some embodiments, repository engines may be arranged to implement incremental collection processes that may efficiently identify one or more new or updated context records from external systems.

In some embodiments, repository engines may be arranged to use libraries, plug-ins, instructions, or the like, provided by configuration information for integrating with one or more external services. Accordingly, in some embodiments, repository engines may be adaptable to different information sources that have the potential to include relevant context records.

Note, this block is indicated as being optional because in some embodiments external sources might not be used for sourcing context records.

At block 1006, in one or more of the various embodiments, optionally, repository engines may be arranged to obtain one or more candidate context records from one or more users.

In some embodiments, repository engines may be arranged to provide one or more user interfaces that enable security analysts, system administrators, domain experts, or the like to manually submit context records based on their specialized knowledge. In some embodiments, repository engines may be configured to implement structured input forms that ensure user-provided information includes necessary metadata such as confidence indicators, relevant entities, or expiration criteria.

Also, in some embodiments, repository engines may be arranged to extract implicit facts for context records from communications that may occur during incident response activities, including chat logs, email threads, ticketing system notes, or the like. Accordingly, in some embodiments, repository engines may be configured to implement validation workflows for some or all user-submitted facts that might require verification before repository inclusion. In some embodiments, repository engines may be arranged to track the effectiveness of user-contributed information in subsequent investigations to identify valuable human intelligence sources or otherwise establish reliability/veracity profiles for individual contributors. Accordingly, in some embodiments, repository engines may be configured to provide feedback to users about how their contributed facts impact analysis quality to encourage ongoing high-quality submissions.

Note, this block is indicated as being optional because in some embodiments user input might not be used for sourcing context records.

At block 1008, in one or more of the various embodiments, repository engines may be arranged to evaluate the one or more candidate context records to identify one or more valuable context records that may be preserved in the context repository.

In some embodiments, repository engines may be arranged to apply evaluation criteria including uniqueness, specificity, consistency with existing context records, temporal relevance, entity coverage, or source reliability. In some embodiments, repository engines may be configured to detect redundancies or conflicts between candidate context records or existing repository contents to prevent or identify duplication or contradiction. In some embodiments, repository engines may be arranged to assess the potential scope of applicability for each context record across different event types, entity classes, or security domains. Accordingly, in some embodiments, repository engines may be configured to calculate composite quality scores that balance multiple evaluation dimensions based on organizational priorities. In some embodiments, repository engines may be arranged to apply different evaluation thresholds based on information categories, criticality levels, or storage constraints. Accordingly, in some embodiments, repository engines may be configured to generate detailed assessment records documenting the evaluation rationale to support audit requirements or governance processes. Thus, in some embodiments, repository engines may be arranged to ensure context records that include high-value facts with appropriate quality attributes may be selected for inclusion in the context repository.

At block 1010, in one or more of the various embodiments, repository engines may be arranged to update the context repository based on the one or more valuable facts.

In some embodiments, repository engines may be arranged to insert new context records that include one or more facts with appropriate entity associations, temporal metadata, confidence indicators, source attributions, relationship links, or the like. In some embodiments, repository engines may be configured to establish connections between newly added context records or existing repository content. In some embodiments, repository engines may be arranged to update indexing structures to ensure newly added context records become immediately discoverable through appropriate query paths.

Also, in some embodiments, repository engines may be configured to maintain detailed audit logs documenting all additions, modifications, or relationship changes within the context repository. In some embodiments, repository engines may be arranged to trigger notifications to relevant system components about significant repository updates that may impact ongoing investigations. Accordingly, in some embodiments, repository engines may be arranged to implement integrity checks following update operations to verify that repository consistency constraints remain satisfied. Thus, in some embodiments, repository engines may be arranged to ensure that context repositories continuously evolve with new valuable context records while maintaining structural integrity or performance characteristics.

Next, in one or more of the various embodiments, control may be returned to a calling process.

Figure 11:
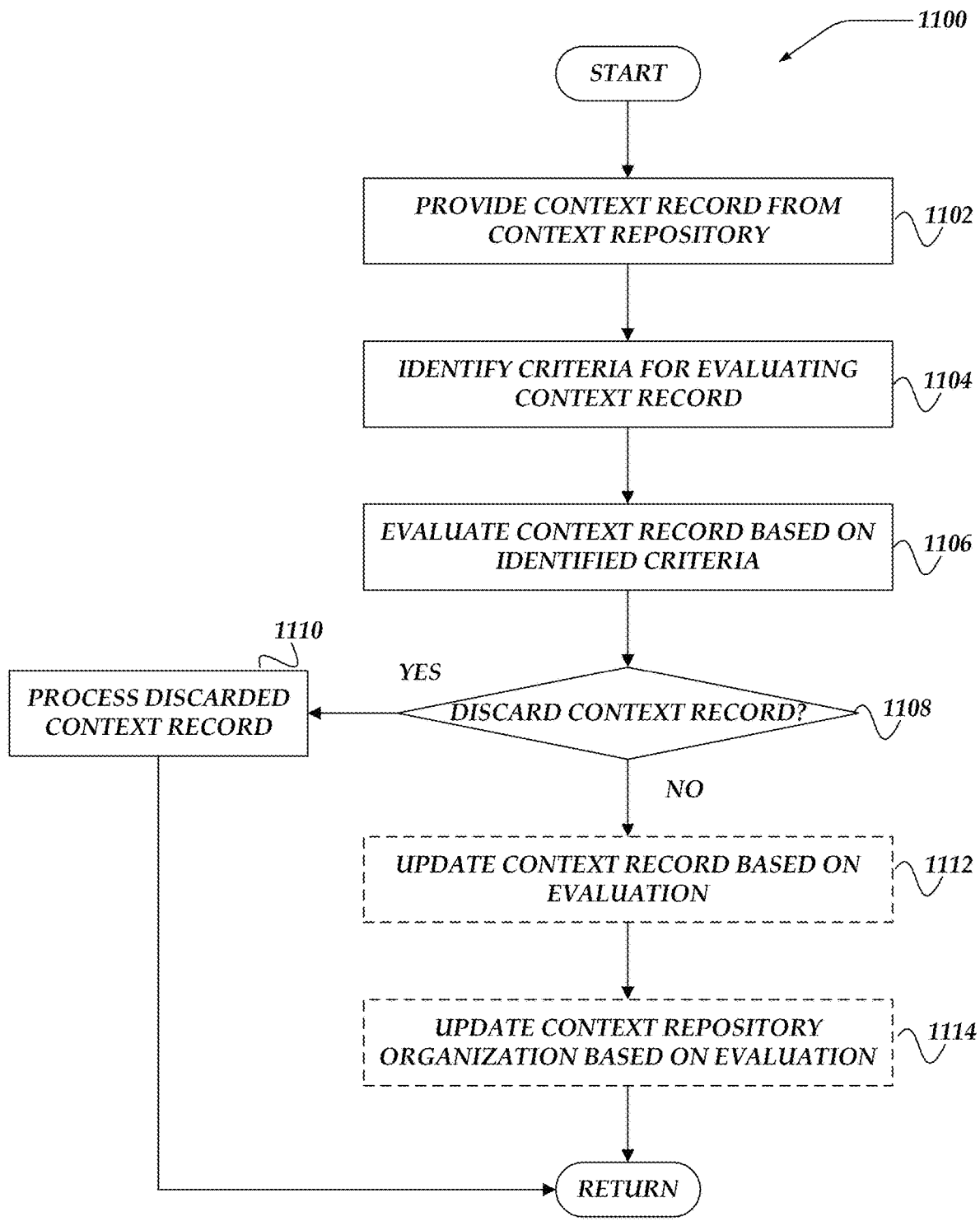
FIG. 11 illustrates a flowchart of a process for context repository management in accordance with one or more of the various embodiments.

FIG. 11 illustrates a flowchart of process 1100 for context repository management in accordance with one or more of the various embodiments. After a start block, at block 1102, in one or more of the various embodiments, repository engines may be provided one or more context records from a context repository.

In some embodiments, repository engines may be configured to continuously or periodically examine context repository organization (e.g., schema, layout, or the like) or context records to identify if schema/layout changes may be recommended. Also, in some embodiments, repository engines may be arranged to evaluate existing context records to determine if one or more context records may be removed or deleted from the context repository. Accordingly, in some embodiments, repository engines may be arranged to proactively manage the contents or organization of context repositories.

In some embodiments, repository engines may be arranged to retrieve one or more context records from context repositories based on various selection criteria, such as context record age, relevance scores, confidence metrics, usage frequency, or associated entities. In some embodiments, repository engines may be configured to evaluate context records in batches during scheduled maintenance periods to optimize repository performance. Also, in some embodiments, repository engines may be configured to prioritize evaluation of context records based on storage utilization metrics, query performance impact, context record retention, or the like.

Also, in some embodiments, repository engines may select context records for evaluation using sampling techniques to assess overall repository quality without examining every stored context record during each evaluation operation. In some embodiments, repository engines may be configured to focus on context records associated with particular domains, subjects, or entity types that may be undergoing schema refinement or organizational restructuring.

At block 1104, in one or more of the various embodiments, repository engines may be arranged to identity one or more criteria for evaluating the context records.

In some embodiments, evaluation criteria may include one or more temporal relevance measures, such as context record age, last access timestamp, or time-to-live settings configured for specific context record categories. Also, in some embodiments, repository engines may consider one or more quality indicators including confidence scores, corroboration levels, source reliability ratings, contradiction indicators, or completeness metrics. In some embodiments, repository engines may include organizational efficiency criteria such as storage efficiency impact, query performance effects, schema compatibility, or redundancy measures. Accordingly, in some embodiments, repository engines may be arranged to select different evaluation criteria based on the type of context record being assessed, applying domain-specific rules to different categories of information. In some embodiments, repository engines may be configured to incorporate feedback from analysis engines regarding context record utility in recent investigations to adjust evaluation criteria dynamically. Thus, in some embodiments, the specific criteria used for evaluation may evolve over time based on operational patterns, repository performance metrics, changing organizational requirements, or the like.

At block 1106, in one or more of the various embodiments, repository engines may be arranged to evaluate the context record based on the identified criteria.

In some embodiments, evaluation of context records may involve calculating multiple scores or binary assessments against each criterion which may be used to generate a comprehensive evaluation profile for the context record. In some embodiments, repository engines may compare the context record against similar or related context records to identify redundancies, contradictions, or opportunities for consolidation. In some embodiments, repository engines may evaluate the context record's structure or format against the current repository schema requirements, identifying compatibility issues or optimization opportunities. Accordingly, in some embodiments, repository engines may analyze usage patterns associated with the context record, examining how frequently it has been retrieved, which analysis patterns have incorporated it, or which entities commonly reference it. In some embodiments, repository engines may assess the uniqueness of information provided by the context record relative to other context records in the repository to determine its distinctive contribution value.

In some embodiments, repository engine may be configured to recognize that some context records may have limited lifetime or limited relevance time-windows. For example, in some embodiments, if the context record is based on an employee taking a vacation or other short-term absences, that context record may be evaluated as being less relevant once the associated time-window has passed.

At decision block 1108, in one or more of the various embodiments, if the context record may be discarded, control may flow to block 1110; otherwise, control may flow to block 1112.

In some embodiments, this decision may be based on one or more composite scores derived from evaluations across multiple criteria. In some embodiments, configurable thresholds may be used to determine discard eligibility. In some embodiments, repository engines may be arranged to implement tiered decision logic where context records exceeding critical thresholds for certain criteria may be marked for discard regardless of other evaluation results. In some embodiments, repository engines may consider the availability of replacement or superior context records covering the same information before recommending discard actions. Accordingly, in some embodiments, repository engines may be configured to flag borderline cases for human review while automatically processing strong discard candidates. In some embodiments, repository engines may be arranged to incorporate historical discard decision patterns to improve consistency in applying evaluation criteria across similar context records.

At block 1110, in one or more of the various embodiments, repository engines may be arranged to process the discarded context records.

In some embodiments, processing discarded context records may include archiving them in other storage with appropriate metadata rather than permanent deletion. In some embodiments, this may preserve historical information while optimizing context repository performance. In some embodiments, repository engines may be arranged to extract valuable metadata or relationship information from the discarded context records before removing them from active storage. In some embodiments, repository engines may be arranged to generate audit records documenting the discard decision, including the specific criteria failures or threshold violations that triggered the discard recommendation.

Also, in some embodiments, repository engines may be arranged to update references or dependencies in other context records that may have linked to the discarded context record to maintain referential integrity within the repository. In some embodiments, repository engines may analyze patterns in discarded context records to identify potential systematic issues with context record collection sources or methods. Accordingly, in some embodiments, repository engines may be configured to generate recommendations for improving context record selection or acquisition processes.

At block 1112, in one or more of the various embodiments, optionally, repository engines may be arranged to update the context record based on the evaluation.

In some embodiments, these updates may include refining one or more metadata fields such as one or more of confidence scores, relevance ratings, category classifications, or the like based on the evaluation results. In some embodiments, repository engines may be arranged to enhance the context record structure to better align with current schema requirements, adding one or more fields, normalizing formats, restructuring relationships in the context repository, or the like. In some embodiments, repository engines may be arranged to merge complementary information from related context records to create more comprehensive entries while reducing redundancy.

Also, in some embodiments, repository engines may be arranged to update usage metrics to record that the context record has undergone evaluation processing for tracking purposes. In some embodiments, repository engines may be configured to add quality indicators or verification timestamps to document the evaluation process outcome to provide transparency for future use of context records.

Note, this block is indicated as being optional because in some cases the context records being evaluated may not need to be updated.

At block 1114, in one or more of the various embodiments, optionally, repository engines may be arranged to update the context repository organization based on the evaluation.

In some embodiments, organizational updates may include one or more modification to the schema such as adding new metadata fields, deprecating underutilized attributes, or restructuring entity relationships based on observed context record usage patterns.

In some embodiments, repository engines may be arranged to generate recommendations for optimizing storage structures, including indexing strategies, partitioning schemes, or caching configurations to improve query performance against frequent context records access patterns. In some embodiments, repository engines may be configured to propose taxonomy updates to suggest one or more new categorization hierarchies or classification schemes to dynamically organize the evolving context record collection. Accordingly, in some embodiments, repository engines may be arranged to automatically reorganize context repositories based on various evaluation analytics. In some embodiments, repository engines may be arranged to move frequently accessed context records to higher-performance storage tiers or grouping commonly co-referenced context records for improved locality.

Also, in some embodiments, repository engines may be arranged to update metadata catalogs or search indices associated with context records to reflect the current state of the context repository following evaluation-driven changes. Thus, in some embodiments, the context repository structure itself may evolve through continuous improvement based on the systematic evaluation of its contents.

Next, in one or more of the various embodiments, control may be returned to a calling process.

Figure 12:
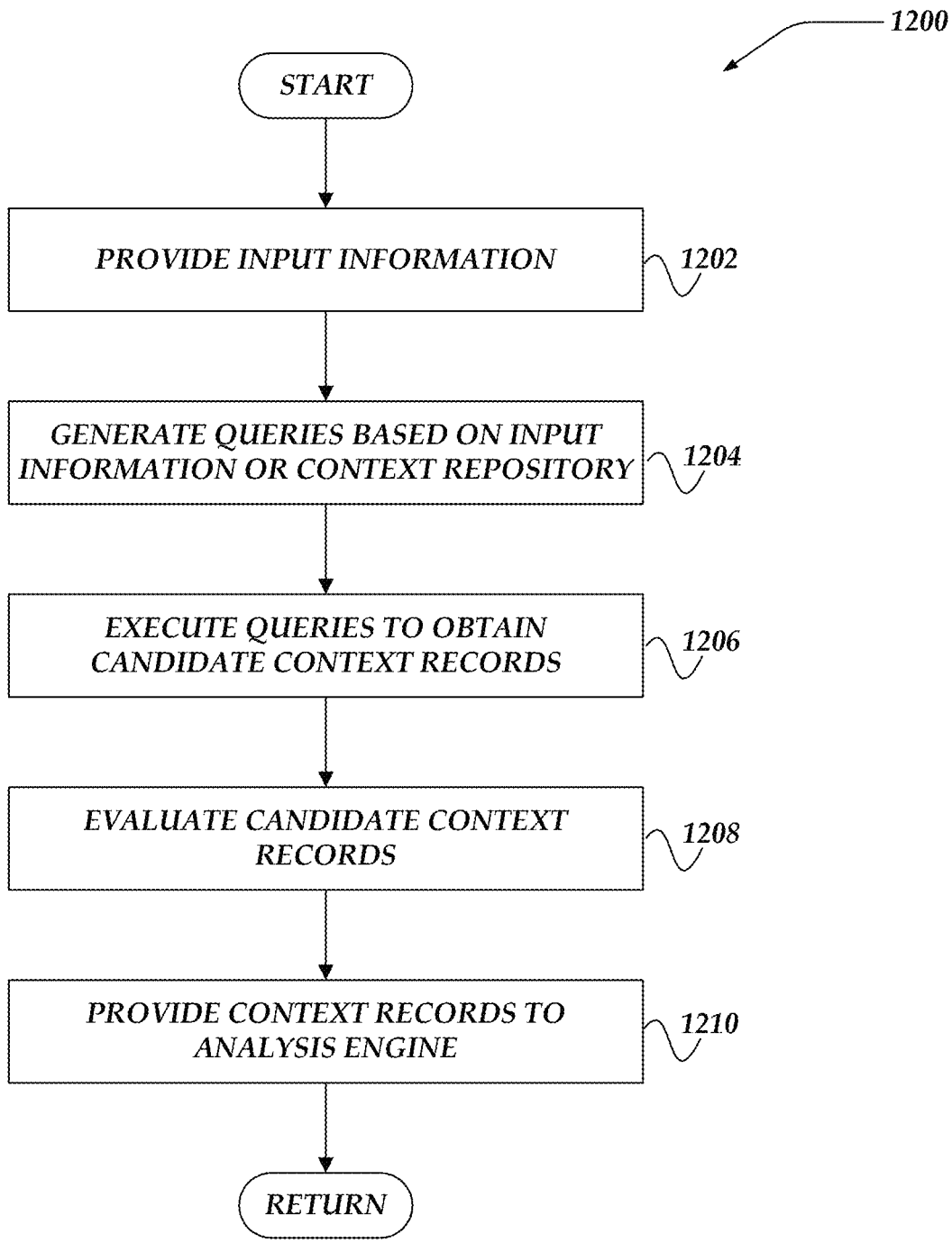
FIG. 12 illustrates a flowchart of a process for context repository management in accordance with one or more of the various embodiments.

FIG. 12 illustrates a flowchart of process 1200 for context repository management in accordance with one or more of the various embodiments. After a start block, at block 1202, in one or more of the various embodiments, repository engines may be provided one or more input information.

As described above, in some embodiments, input information may include event data, security alerts, user activities, network traffic patterns, system logs, or the like that may be relevant for analysis. In some embodiments, this input information may originate from analysis engines, security monitoring systems, user interfaces, or automated detection tools. Accordingly, in some embodiments, the input information may contain identifiers, timestamps, source indicators, or other metadata that repository engines may use to formulate appropriate queries for the context repository.

At block 1204, in one or more of the various embodiments, repository engines may be arranged to generate one or more queries based on the input information or the context repository.

In some embodiments, repository engines may extract entities, event fields, timestamps, locations, or the like from the input information to construct query targeted to identify relevant context records. In some embodiments, repository engines may generate one or more specialized queries.

At block 1206, in one or more of the various embodiments, repository engines may be arranged to execute the one or more queries to obtain one or more candidate context records.

In some embodiments, these queries may be executed against various context record features included in the context repository, including historical event data, entities, entity relationships, established policies, previous incident reports, or the like. In some embodiments, repository engines may apply certain constraints during query execution such as time boundaries, confidence thresholds, or relevancy parameters.

At block 1208, in one or more of the various embodiments, repository engines may be arranged to evaluate the candidate context records.

In some embodiments, this evaluation may include assessing relevance of the candidate context records to the current input information, verifying context record freshness, checking source reliability, confirming consistency with other known context records, determining confidence levels, or the like. In some embodiments, repository engines may apply one or more scoring mechanisms to rank context records based on their potential utility for the current analysis scenario. Accordingly, in some embodiments, repository engines may filter out context records that fall below certain quality thresholds or context records that may be redundant given the current analysis context. Thus, in some embodiments, the evaluation process may retain pertinent context records while excluding irrelevant context records.

At block 1210, in one or more of the various embodiments, repository engines may be arranged to provide the context records to an analysis engine.

In some embodiments, repository engines may structure the collection of context records as one or more of an ordered list, categorical groupings, entity-relationship mappings, time-based sequences, or the like. In some embodiments, repository engines may include supplementary metadata such as confidence scores, source information, expiration indicators, or transience flags with each context record. Accordingly, in some embodiments, repository engines may format the context records in a manner optimized for the particular analysis engine that will consume the information. Thus, in some embodiments, the context records may be presented in a format that enables efficient incorporation into the analysis process without requiring substantial additional processing by the analysis engine.

Next, in one or more of the various embodiments, control may be returned to a calling process.

Figure 13:
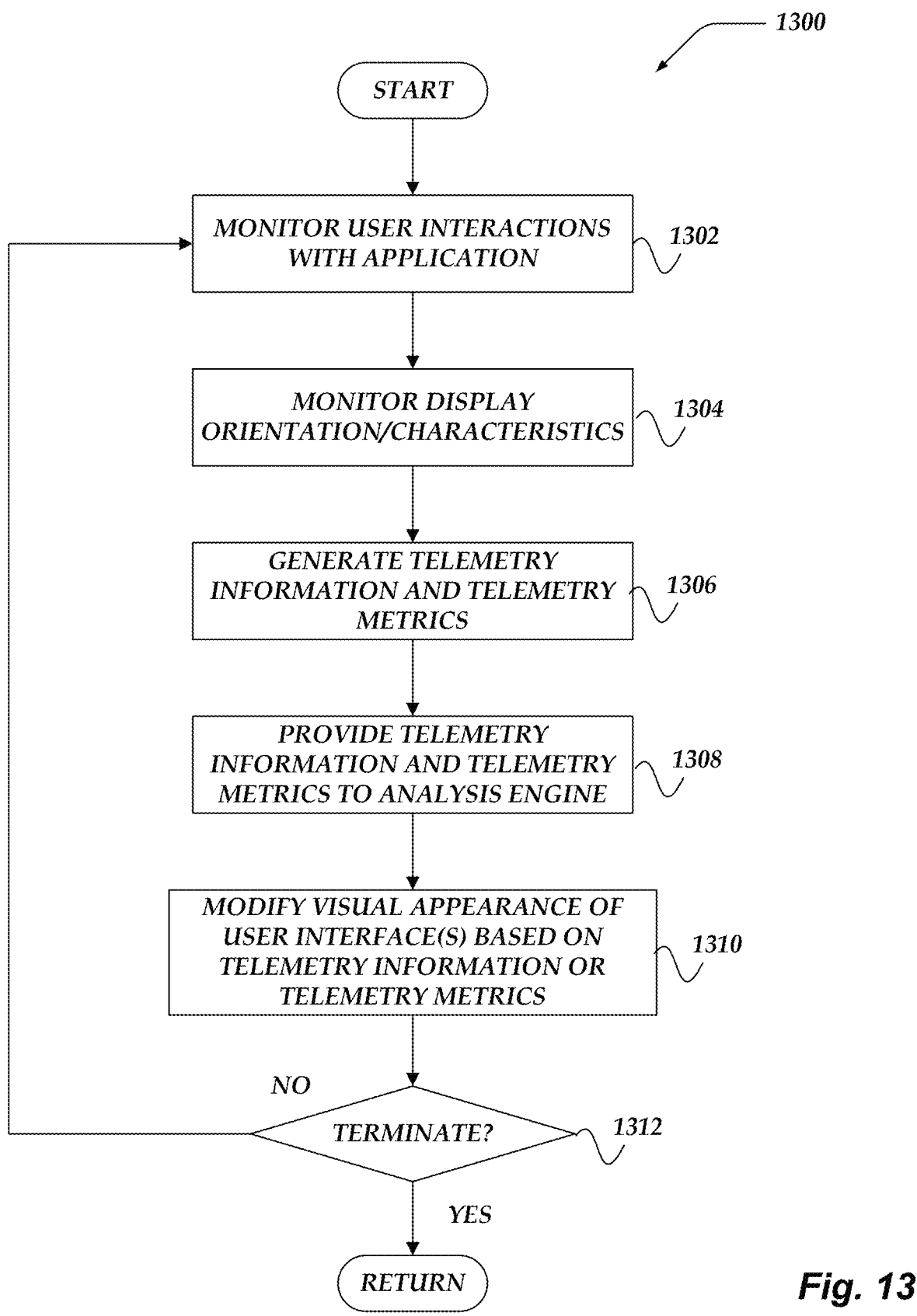
FIG. 13 illustrates a flowchart of a process for collecting and applying telemetry information and telemetry metrics for context repository management in accordance with one or more of the various embodiments.

FIG. 13 illustrates a flowchart of process 1300 for collecting and applying telemetry information and telemetry metrics for context repository management in accordance with one or more of the various embodiments. After a start block, at block 1302, in one or more of the various embodiments, telemetry engines may be arranged to monitor one or more user interactions with one or more applications. As described above, telemetry engines may be arranged to monitor or track how users may physically interact with one or more user interfaces associated with the one or more applications. In some embodiments, user interactions may include active interactions associated with user activity or passive interactions associated with user inactivity. Also, in one or more embodiments, various types of collected user telemetry may be based on a user's selection or non-selection of one or more particular elements or content in a display panel, pointing device (mouse) hover time over particular content or elements in a display panel, user dwell time between actions in a display panel, dwell time for viewing a display panel by a user, and the like. Also, in some embodiments, telemetry engines may be arranged to track mouse movement, eye movement, keystrokes, or the like, to determine how users may interact with information displayed in user interfaces. See, description for FIG. 4 for additional details.

At block 1304, in one or more of the various embodiments, telemetry engines may be arranged to monitor one or more display characteristics or display orientation characteristics.

As described above, in some embodiments, telemetry engines may be arranged to monitor various display characteristics employed for displaying the user interfaces, including the size/type of display, screen resolution, screen orientation, number of active displays, screen brightness, refresh rate, aspect ratio, color dynamic range, windowed or full screen modes, or the like. In some embodiments, screens, monitors, or operating systems may provide interfaces or APIs that enable telemetry engines to obtain information about the current state or status of the display screen. In some cases, for some embodiments, operating systems or other services may be configured to actively notify telemetry engines if one or more screen characteristics may change.

At block 1306, in one or more of the various embodiments, telemetry engines may be arranged to generate telemetry information or one or more telemetry metrics. In some embodiments, the monitored interactions or display characteristics may be represented as telemetry information or telemetry metrics. The particular format of the telemetry information or telemetry metrics may vary depending on the type interactions or characteristics being represented. Accordingly, in some embodiments, telemetry information or telemetry metrics may be included in one or more data structures that may be communicated to other applications or services. For example, in some embodiments, telemetry information or telemetry metrics may be represented using key-value pair data structures that include a key field representing the label or type of metric and a value field that represents the value of the metric.

At block 1308, in one or more of the various embodiments, telemetry engines may be arranged to provide the telemetry information and telemetry metrics to a runtime engine.

In some embodiments, telemetry engines may be arranged to provide one or more interfaces or APIs that enable other applications or services, such as analysis engines, repository engines, or the like, to gain access to the telemetry information or telemetry metrics. In some embodiments, telemetry engines may be configured to push some or all of the telemetry information or telemetry metrics to one or more subscribing application or services. Also, in some embodiments, telemetry engines may be configured to enable other application or services to poll or otherwise request-on-demand some or all of the telemetry information or telemetry metrics.

At block 1310, in one or more of the various embodiments, analysis engines or repository engines may be arranged to modify the visual appearance of one or more user interfaces based on the telemetry information or telemetry metrics.

Accordingly, in some embodiments, analysis engines or repository engines may be arranged to dynamically change the visual appearance of the one or more user interfaces to improve the efficiency and effectiveness of the user interfaces based on some or all of the telemetry information or telemetry metrics. For example, analysis engines may be arranged to dynamically select, position, size, shape, remove, hide, inactivate, disable, highlight, or style one or more visual user interface components such as display panels, controls, elements, or content based on, among other things, one or more telemetry metrics. For example, if telemetry information or telemetry metrics indicate that users are focusing on or navigating to particular user interface views, components or user interface panels, analysis engines may be arranged to highlight or size the preferred user interface elements or display panels. For example, if users are determined to rarely interact with a particular display panel, analysis engines may be arranged to reduce the size, diminish the shape, disable its controls, and re-position that display panel to improve the efficiency of display screen usage. See, also FIG. 4 and its description.

At decision block 1312, in one or more of the various embodiments, if the telemetry engine, analysis engine, or repository engine may be terminated, control may be returned to a calling process; otherwise, control may loop back to block 1302. In some embodiments, telemetry engines may be arranged to continuously or periodically provide updated/current telemetry information or telemetry metrics to enable analysis engines or repository engines to dynamically change the visual appearance of the one or more user interfaces. Accordingly, in some embodiments, process 1300 may continue operation until it may be explicitly terminated or the operation of the associated analysis engines or repository engines may be terminated.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of these innovations.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of these innovations.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Figure 14:
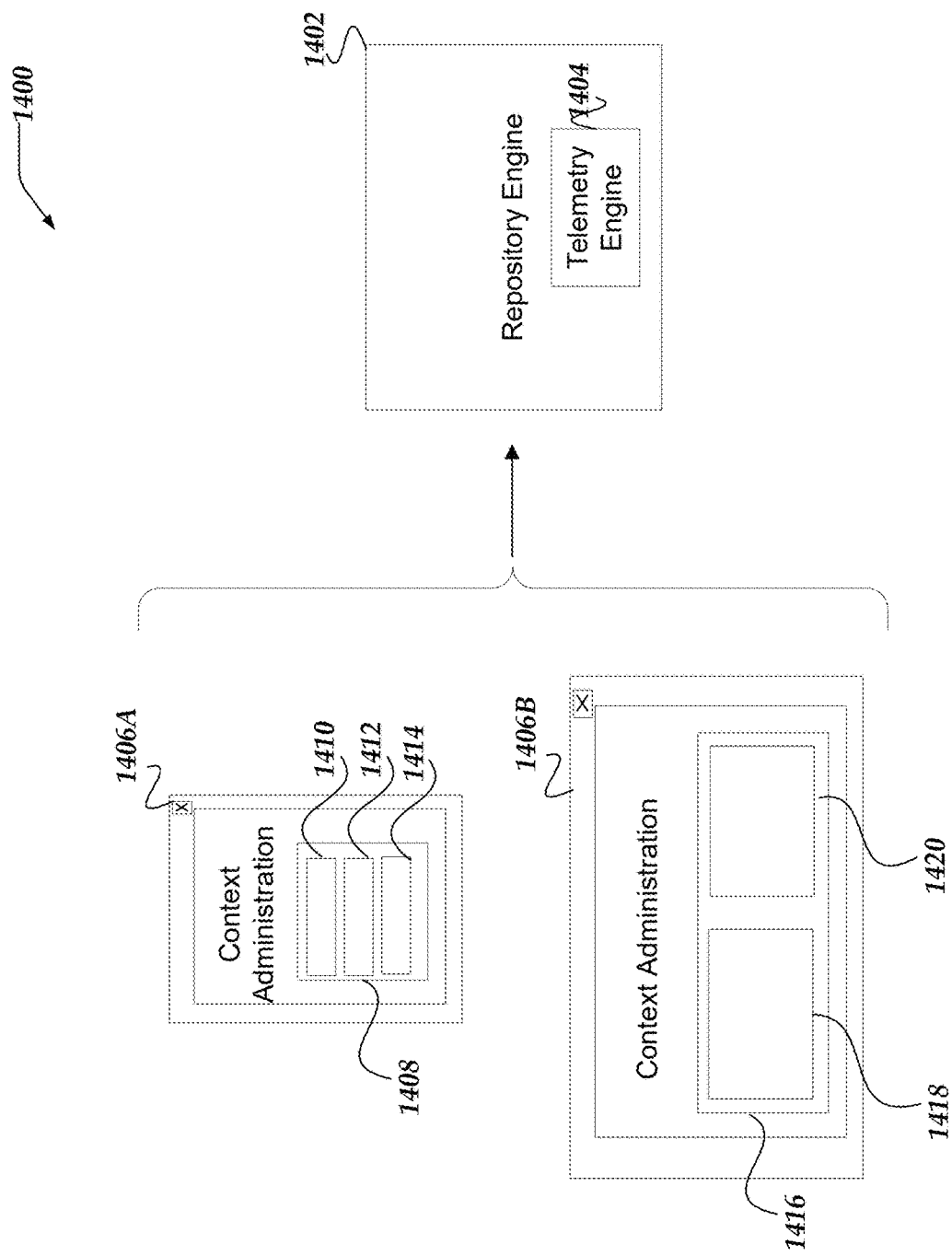
FIG. 14 illustrates a system for collecting and applying telemetry information and telemetry metrics for context repository management in accordance with one or more of the various embodiments.

FIG. 14 illustrates a logical schematic of system 1400 for collecting and applying telemetry information and telemetry metrics for context repository management in accordance with one or more of the various embodiments. System 1400 may comprise various constituents, including: repository engine 1402; telemetry engine 1404; one or more client user interfaces, such as user interface 1406 (A or B); or the like.

As described above, in some embodiments, repository engines, such as repository engine 1402 may be arranged to perform actions to support the operation, organization, or management of context repositories, such as context repository 430 shown in FIG. 4.

Further, in some embodiments, systems, such as system 1400 may include one or more telemetry engines, such as telemetry engine 1404. In some embodiments, telemetry engines may be arranged to monitor or evaluate interactions with applications or user interfaces such as user interface 1406A, user interface 1406B, or the like. In some embodiments, this may include monitoring how users or even other applications may interact with user interfaces, interactive reports, various applications, or one or more system features. Note, in this example, for some embodiments, user interface 1406A may represent the presentation or display of a user interface in a first adapted arrangement while user interface 1406B may represent the present of display of the same user interface having a second adapted arrangement. For example, for some embodiments, user interface 1406A may be the user interface displayed in portrait mode while the user interface 1406B may be considered to be the user interface in landscape mode after a hardware display has been rotated.

In some embodiments, user interfaces, such as user interface 1406A or user interface 1406B may include various windows, controls, or other user interface features. In some embodiments, user interfaces may include various user interface panels, such as panel 1408, panel 1416, or the like. For example, in some embodiments, panel 1408, or the like may represent a user interface that enables users, such as security analysts, to review context information or context information acquisition displayed in a portrait (vertical) orientation while user interface 1406B may represent context information displayed in a landscape (horizontal) orientation. Further, in some embodiments, element 1410, element 1412, element 1414, element 1418, element 1420, or the like may be considered to represent various user interface elements, controls, buttons, list items, report features, user interface components, displayed content, formatted content, or the like that may be included in user interfaces.

Also, for example, for some embodiments, user interface 1406A or 1406B may be considered a user interface that enables administrative users to work with context repositories. For example, panel 1408 may be used to select, generate, or modify candidate context records, queries, context repository organization, context repository schemas, or the like. For example, display panel 1408 may be used to display candidate context records sorted based on inferred importance, value, or the like. Likewise, in some embodiments, panels such as panel 1408 may be used to display context repository schema information, context records, context record meta-data, display reports regarding context records and their relevance to pending or previous incident investigations, or the like.

In some embodiments, repository engines, such as repository engine 1402 (as well as analysis engines, telemetry engines, ingestion engines, or the like) may be arranged to generate or display user interfaces, such as user interface 1406A or user interface 1406B to users using one or more of video interface 242, projector 246, display 250, or the like, of a client computer, such as client computer 200. Similarly, in some embodiments, analysis engine 402, repository engine 430, or ingestion engine 404 may be arranged to generate or display user interface 432, user interface 436, or the like to users using a one or more of input/output interface 338, display 350, audio interface 356, or the like, of a network computer, such as network computer 300.

In some embodiments, repository engines, such as repository engine 1402 (as well as analysis engines, telemetry engines, ingestion engines, or the like) may be arranged to collect various telemetry or other metrics associated with user interactions with user interfaces. In some embodiments, telemetry may include tracking or monitoring if users may be in agreement with context records, context repository organization, report arrangement/organization, or the like. In some embodiments, repository engines, or the like may be enabled to employ telemetry information or telemetry metrics collected or determined by telemetry engines, such as telemetry engine 1404. In some embodiments, telemetry engines may be separate from analysis engines, repository engines, ingestion engines, or the like as shown in FIG. 4. Also, in some embodiments, telemetry engines may be part of or otherwise embedded in analysis engines, repository engines, ingestion engines, or the like.

Also, in one or more embodiments, various types of collected user telemetry may include a user's selection or non-selection of one or more particular elements or content in a display panel, pointing device (mouse) hover time over particular content or elements in a display panel, user dwell time between actions in a display panel, dwell time for viewing a display panel by a user, and the like.

In one or more of the various embodiments, analysis engines, repository engines, ingestion engines, or the like may be arranged to monitor telemetry information associated with one or more users.

Accordingly, in some embodiments, analysis engines, repository engines, ingestion engines, or the like may be arranged to provide one or more user interface facilities to collect direct feedback from one or more of the users that may interact with information displayed in the one or more user interfaces. For example, in some embodiments, user interfaces may include controls that enable authorized users to grade one or more event reports, recommended changes to context repository schemas, candidate context records, or the like.

In some embodiments, grades or scores may be binary (e.g., like/dislike), discrete (e.g., one-four stars, letter grades), continuous values, or the like.

Also, in one or more of the various embodiments, analysis engines, repository engines, ingestion engines, or the like may be arranged to provide user interfaces that monitor how users interact with input information, events, event reports, recommend resolution actions, or the like. In some embodiments, telemetry information employed to monitor user preferences may be based on monitoring user interactions as well as direct feedback. Accordingly, in some embodiments, input information, events, event reports, recommend resolution actions, or the like, that may appear well-formed but are ignored or discarded by users may be inferred to be poorly received. For example, for some embodiments, if the top ranked results or events provided in response to user actions, user queries, or the like, are ignored or lower ranked results are favored by users, it may be inferred that there may be a problem with the data or the display of the data.

Further, in some embodiments, repository engines, or the like may be arranged to receive telemetry information from other services or applications. Accordingly, in one or more of the various embodiments, repository engines, or the like may not be required to directly monitor activity associated with the input information, events, event reports, recommend resolution actions, or the like. For example, for some embodiments, user interfaces, such as user interface 1406A or user interface 1406B may be displayed to users via desktop computer applications, mobile applications, web-based applications, or the like. In some embodiments, such applications may collect the telemetry information and provide some or all it to analysis engines, repository engines, ingestion engines, or the like rather than requiring the analysis engines, repository engines, ingestion engines, or the like to include monitoring facilities on user-facing applications.

Accordingly, in some embodiments, repository engine 1402, or the like may be arranged to collect metrics or telemetry associated with user interactions with user interface 1406A or user interface 1406B using a one or more of input/output interface 238, cameras 240, touch interface 244, keypad 252, audio interface 256, GPS, 258, open air gesture interface 260, haptic interface 264, pointing device interface 266, or the like, of a client computer, such as client computer 200. Similarly, in some embodiments, repository engine 1402, or the like may be arranged to collect metrics or telemetry associated with user interactions with user interface 1406A, or user interface 1406B using a one or more of input/output interface 338, GPS 340, keyboard 352, audio interface 356, pointing device interface 358, or the like, of a network computer, such as network computer 300.

In some embodiments, repository engines, or the like may be arranged to track mouse movement, eye movement, keystrokes, or the like, to determine how users may interact with information (e.g., input information, events, event reports, recommended resolution actions, context records, context repository organization, context repository schemas, or the like) displayed in user interfaces. Accordingly, in some embodiments, repository engines, or the like may be arranged to evaluate at least the quality of various investigation recommendations, schema changes, context record selection, report characteristics, or the like based on how users interact with them via the user interfaces. For example, if users consistently select or otherwise favor interacting with items or events ranked lower than others, it may indicate that one or more models performing the ranking or item selection may be experiencing diminished or diminishing effectiveness. Likewise, in some embodiments, users may reject or ignore report results, suggested actions, context record suggestions, context repository organization recommendations, or the like which may indicate that one or more associated models or systems may be experiencing diminished or diminishing effectiveness.

In some embodiments, repository engines, or the like may be arranged to associate a performance score with user interfaces used in the system based on the user interaction metrics or telemetry. Accordingly, in some embodiments, if the performance score associated with a user interface or user interface element falls below a defined threshold value, repository engines, or the like may be arranged to suspend those user interfaces (or portions thereof) from operation. Or, in some embodiments, repository engines, or the like may be arranged to automatically modify the deficient user interfaces.

Also, in some embodiments, telemetry engines may be arranged to collect or determine telemetry information that includes user telemetry, user feedback, or telemetry metrics that may be used to dynamically transform user interfaces, display panels, and the like. The dynamic transformation may include arrangement, re-arrangement, elimination, addition, or adaptation of content and visual elements in user interfaces and display panels based on at least the collected telemetry information.

Additionally, in some embodiments, telemetry engines may collect metrics associated with the one or more user interactions with the system including content within the user interfaces and display panels. In some embodiments, user profiles may be configured to dynamically include user interface preferences based on collected user telemetry metrics and user feedback. Accordingly, in some embodiments, analysis engines, repository engines, ingestion engines, or the like may dynamically change the visual appearance of the user interfaces to improve the efficiency and effectiveness of the system or its user interfaces for the user. Accordingly, in some embodiments, analysis engines, repository engines, or ingestion engines may be arranged to dynamically select, position, size, shape, remove, hide, inactivate, disable, highlight, or style one or more visual user interface components such as display panels, controls, elements and content based on one or more of user telemetry metrics and user feedback. For example, if user interactions with the user interface are tracked focusing on or navigating to particular user interface views, components or user interface panels, analysis engines, repository engines, or ingestion engines may be arranged to dynamically highlight or size the preferred user interface elements and/or display panels. For example, if users are determined to rarely interact with a user interface element, such as element 1414, repository engines, or the like may be arranged to dynamically reduce the size, diminish the shape, disable its controls, or re-position element 1414 by displaying a smaller sized greyed out version of element 1414 in its display panel.

Also, in some embodiments, repository engines, or the like may be arranged to adapt user interfaces based on the size/type of display, input methods, user status, or the like. For example, in some embodiments, if a user is determined to be operating using a mobile device, one or more user interface elements may be dynamically positioned differently. In some cases, for some embodiments, depending on the display type or display size, one or more user interface elements may be hidden from view. For example, for some embodiments, a repository engine may be arranged to dynamically modify or re-arrange user interface 1406A to obtain user interface 1406B based on telemetry associated with the display or associated user interactions. Accordingly, in this example, display panel 1416 may be considered to be dynamically modified or rearranged to accommodate the modified physical orientation of the display. Further, in this example, user interface 1406 now may be considered to display two elements (element 1418 and element 1420) rather than three elements as were displayed in user interface 1406A. Thus, in this example, repository engine 1402 may display two elements for the landscape (horizontal) orientation instead of the three elements displayed in the portrait (vertical) orientation based on one or more telemetry metrics.

Accordingly, in some embodiments, repository engines, or the like may be arranged to tangibly modify user interfaces, display panels, interactive reports, input collection, input selection, input data represent, context records, context repository organization, context repository schemas, or the like, based on the efficient and effective performance of processes and/or activities associated with various types input information, events, context records, context repositories, context repository schema, or the like as determined by telemetry information, or the like.

What is claimed as new and desired to be protected by Letters Patent of the United States is:

1. A method for managing data in a computing environment using one or more processors to execute instructions that are configured to cause actions, comprising:
   obtaining one or more context records from a repository, wherein each context record includes supplemental information associated with one or more events;
   collecting one or more severity scores for the one or more events based on one or more prompts and the one or more context records, wherein the one or more context records are included in the one or more prompts;
obtaining a criteria to invalidate a portion of the one or more context records, wherein the criteria includes one or more of an age of a context record, a source reliability, a conflict with one or more other context records, or a usage frequency;
modifying the one or more prompts and the repository based on removal of the invalidated portion of the one or more context records;
collecting one or more other severity scores for one or more other events based on the one or more modified prompts, wherein the one or more other severity scores are used to evaluate the one or more events for a report; and
obtaining a user interface that includes one or more display panels for content that includes the report and other information associated with the one or more other events, wherein the content is dynamically transformed and arranged for display to a user based on user interaction telemetry, user feedback and telemetry metrics.

2. The method of claim 1, wherein obtaining one or more context records from the repository, further comprises:
collecting one or more portions of the one or more context records from one or more external data sources including security information and event management systems, user directory services, or configuration management databases; and
obtaining another criteria to validate the one or more context records, wherein the other criteria includes one or more of a source reliability metric or a temporal relevance indicator.

3. The method of claim 1, further comprising:
collecting one or more duplicate context records based on content similarity analysis, wherein the one or more duplicate context records include one or more of a redundant context record, overlapped information content, or a repetitive data element; and
consolidating the one or more duplicate context records.

4. The method of claim 1, further comprising:
obtaining one or more context quality filters to filter the one or more context records based on one or more of a confidence score or a source attribution; and
retaining another portion of the one or more context records that passes the one or more context quality filters.

5. The method of claim 1, wherein collecting one or more severity scores for the one or more events, further comprises:
obtaining one or more enhanced prompts that include context record summaries and entity relationship mappings, wherein the one or more enhanced prompts include one or more of a threat assessment template, a guidance framework, or an analytical structure; and
using the one or more enhanced prompts to train one or more severity assessment models to improve subsequent event classification.

6. The method of claim 1, further comprising:
obtaining one or more composite context records based on consolidation of one or more complementary individual context records, wherein the one or more composite context records include one or more of aggregated entity information, combined relationship data, or an overlapping time window.

7. The method of claim 1, further comprising:
collecting one or more context provenance records based on one or more of a record creation timestamp or a modification history, wherein the one or more context provenance records include one or more of an origination source, an update sequence, or a verification status; and
maintaining an audit trail for the one or more context records using the one or more context provenance records.

8. The method of claim 1, further comprising:
obtaining one or more context record utilization patterns based on one or more of an access frequency or an investigation contribution, wherein the one or more context record utilization patterns include one or more of a retrieval frequency metric, an impact score, or a usage trend indicator; and
organizing the repository based on the one or more context record utilization patterns.

9. The method of claim 1, further comprising:
obtaining one or more repository schemas based on the one or more context records, wherein the one or more repository schemas include one or more of an entity relationship definition, a metadata field specification, or a data type constraint; and
organizing the one or more context records according to the one or more repository schemas for retrieval.

10. The method of claim 1, further comprising:
collecting one or more context evaluation criteria based on one or more of a temporal relevance measure or a usage frequency pattern, wherein the one or more context evaluation criteria includes one or more of a record age threshold, an access frequency metric, or a relevance degradation indicator; and
applying the one or more context record evaluation criteria to identify context records eligible for removal from the repository or archival.

11. A network computer for managing data in a computing environment, comprising:
a memory that stores at least instructions; and
one or more processors that execute instructions that are configured to cause actions, including:
obtaining one or more context records from a repository, wherein each context record includes supplemental information associated with one or more events;
collecting one or more severity scores for the one or more events based on one or more prompts and the one or more context records, wherein the one or more context records are included in the one or more prompts;
obtaining a criteria to invalidate a portion of the one or more context records, wherein the criteria includes one or more of an age of a context record, a source reliability, a conflict with one or more other context records, or a usage frequency;
modifying the one or more prompts and the repository based on removal of the invalidated portion of the one or more context records;
collecting one or more other severity scores for one or more other events based on the one or more modified prompts, wherein the one or more other severity scores are used to evaluate the one or more events for a report; and
obtaining a user interface that includes one or more display panels for content that includes the report and other information associated with the one or more other events, wherein the content is dynamically transformed and arranged for display to a user based on user interaction telemetry, user feedback and telemetry metrics.

12. The network computer of claim 11, wherein obtaining one or more context records from the repository, further comprises:
Collecting one or more portions of the one or more context records from one or more external data sources including security information and event management systems, user directory services, or configuration management databases; and
obtaining another criteria to validate the one or more context records, wherein the other criteria includes one or more of a source reliability metric or a temporal relevance indicator.

13. The network computer of claim 11, wherein the one or more processors execute instructions that are configured to cause actions, further comprising:
collecting one or more duplicate context records based on content similarity analysis, wherein the one or more duplicate context records include one or more of a redundant context record, overlapped information content, or a repetitive data element; and
consolidating the one or more duplicate context records.

14. The network computer of claim 11, wherein the one or more processors execute instructions that are configured to cause actions, further comprising:
obtaining one or more context quality filters to filter the one or more context records based on one or more of a confidence score or a source attribution; and
retaining another portion of the one or more context records that passes the one or more context quality filters.

15. The network computer of claim 11, wherein collecting one or more severity scores for the one or more events, further comprises:
obtaining one or more enhanced prompts that include context record summaries and entity relationship mappings, wherein the one or more enhanced prompts include one or more of a threat assessment template, a guidance framework, or an analytical structure; and
using the one or more enhanced prompts to train one or more severity assessment models to improve subsequent event classification.

16. A processor readable non-transitory storage media that includes instructions configured for managing data in a computing environment, wherein execution of the instructions by one or more processors on one or more network computers performs actions, comprising:
obtaining one or more context records from a repository, wherein each context record includes supplemental information associated with one or more events;
collecting one or more severity scores for the one or more events based on one or more prompts and the one or more context records, wherein the one or more context records are included in the one or more prompts;
obtaining a criteria to invalidate a portion of the one or more context records, wherein the criteria includes one or more of an age of a context record, a source reliability, or a usage frequency;
modifying the one or more prompts and the repository based on removal of the invalidated portion of the one or more context records;
collecting one or more other severity scores for one or more other events based on the one or more modified prompts, wherein the one or more other severity scores are used to evaluate the one or more events for a report; and
obtaining a user interface that includes one or more display panels for content that includes the report and other information associated with the one or more other events, wherein the content is dynamically transformed and arranged for display to a user based on user interaction telemetry, user feedback and telemetry metrics.

17. The media of claim 16, further comprising:
collecting one or more context provenance records based on one or more of a record creation timestamp or a modification history, wherein the one or more context provenance records include one or more of an origination source, an update sequence, or a verification status; and
maintaining an audit trail for the one or more context records using the one or more context provenance records.

18. The media of claim 16, further comprising:
obtaining one or more context record utilization patterns based on one or more of an access frequency or an investigation contribution, wherein the one or more context record utilization patterns include one or more of a retrieval frequency metric, an impact score, or a usage trend indicator; and
organizing the repository based on the one or more context record utilization patterns.

19. The media of claim 16, further comprising:
obtaining one or more repository schemas based on the one or more context records, wherein the one or more repository schemas include one or more of an entity relationship definition, a metadata field specification, or a data type constraint; and
organizing the one or more context records according to the one or more repository schemas for retrieval.

20. The media of claim 16, further comprising:
collecting one or more context evaluation criteria based on one or more of a temporal relevance measure or a usage frequency pattern, wherein the one or more context evaluation criteria includes one or more of a record age threshold, an access frequency metric, or a relevance degradation indicator; and
applying the one or more context record evaluation criteria to identify context records eligible for removal from the repository or archival.

* * * * *